(12) United States Patent
Miwa et al.

(10) Patent No.: US 8,122,984 B2
(45) Date of Patent: Feb. 28, 2012

(54) VEHICLE

(75) Inventors: Koji Miwa, Susono (JP); Shigeki Kinomura, Sunto-gun (JP); Makoto Hirai, Susono (JP); Yoshiaki Atsumi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 260 days.

(21) Appl. No.: 12/452,437

(22) PCT Filed: Aug. 8, 2008

(86) PCT No.: PCT/JP2008/064281
§ 371 (c)(1),
(2), (4) Date: Dec. 30, 2009

(87) PCT Pub. No.: WO2009/022638
PCT Pub. Date: Feb. 19, 2009

(65) Prior Publication Data
US 2010/0133024 A1     Jun. 3, 2010

(30) Foreign Application Priority Data

Aug. 10, 2007   (JP) .................. 2007-209859
Jan. 16, 2008   (JP) .................. 2008-006962

(51) Int. Cl.
*B60W 20/00* (2006.01)
*B60K 15/05* (2006.01)
(52) U.S. Cl. .................. 180/65.27; 296/97.22; 903/930
(58) Field of Classification Search ............. 180/65.265, 180/65.27, 65.21, 69.6, 69.4, 69.5; 903/930; 439/299, 300, 34; 296/97.22; 320/109
See application file for complete search history.

(56) References Cited

U.S. PATENT DOCUMENTS

| | | | |
|---|---|---|---|
| 2,966,248 A | 12/1960 | Armbruster | |
| 5,670,830 A | 9/1997 | Koga et al. | |
| 5,757,595 A | 5/1998 | Ozawa et al. | |
| 7,451,839 B2 * | 11/2008 | Perlman | 180/2.1 |
| 8,028,780 B2 * | 10/2011 | Sagawa et al. | 180/65.27 |
| 2003/0134167 A1 | 7/2003 | Hirakata | |
| 2004/0094230 A1 | 5/2004 | Ono et al. | |
| 2007/0171689 A1 | 7/2007 | Ishikawa et al. | |

FOREIGN PATENT DOCUMENTS

JP        U-4-93209        8/1992

(Continued)

OTHER PUBLICATIONS

Decision on Grant Patent for Invention dated Jul. 11, 2011 in corresponding Russian Patent Application No. 2010108519/11(012014) (with translation).

(Continued)

*Primary Examiner* — Paul N Dickson
*Assistant Examiner* — Keith Frisby
(74) *Attorney, Agent, or Firm* — Oliff & Berridge, PLC

(57) ABSTRACT

A vehicle includes: an engine driven with gasoline; a lid member opening/closing an opening of an accommodation room that accommodates a nozzle receiving unit when gasoline is supplied; a rotating electric machine driven on electric power; a charging/power feeding unit receiving electric power; a lid member opening/closing an opening of an accommodation room accommodating a charging/power feeding unit; and an open/close control mechanism setting the other of the lid member and the lid member in the closed position when one of the lid member and the lid member is set in the open position.

7 Claims, 17 Drawing Sheets

FOREIGN PATENT DOCUMENTS

| | | | |
|---|---|---|---|
| JP | A-6-135302 | | 5/1994 |
| JP | 07192826 A | * | 7/1995 |
| JP | A-8-19114 | | 1/1996 |
| JP | A-9-285022 | | 10/1997 |
| JP | A-10-117444 | | 5/1998 |
| JP | A-11-78527 | | 3/1999 |
| JP | B2-3016349 | | 3/2000 |
| JP | A-2001-105903 | | 4/2001 |
| JP | A-2004-148980 | | 5/2004 |
| JP | A-2004-150064 | | 5/2004 |
| JP | A-2005-93316 | | 4/2005 |
| JP | A-2005-204361 | | 7/2005 |
| JP | A-2005-318682 | | 11/2005 |
| JP | A-2007-196967 | | 8/2007 |
| RU | 2 233 511 C1 | | 7/2004 |
| WO | WO 2005/069471 A1 | | 7/2005 |
| WO | WO 2007/108454 A1 | | 9/2007 |

OTHER PUBLICATIONS

Japanese Decision to Grant Patent mailed on Aug. 4, 2009 in corresponding Japanese Patent Application No. 2008-006962. (with translation).

International Search Report mailed on Nov. 18, 2008 in corresponding International Application No. PCT/JP2008/064281.

* cited by examiner

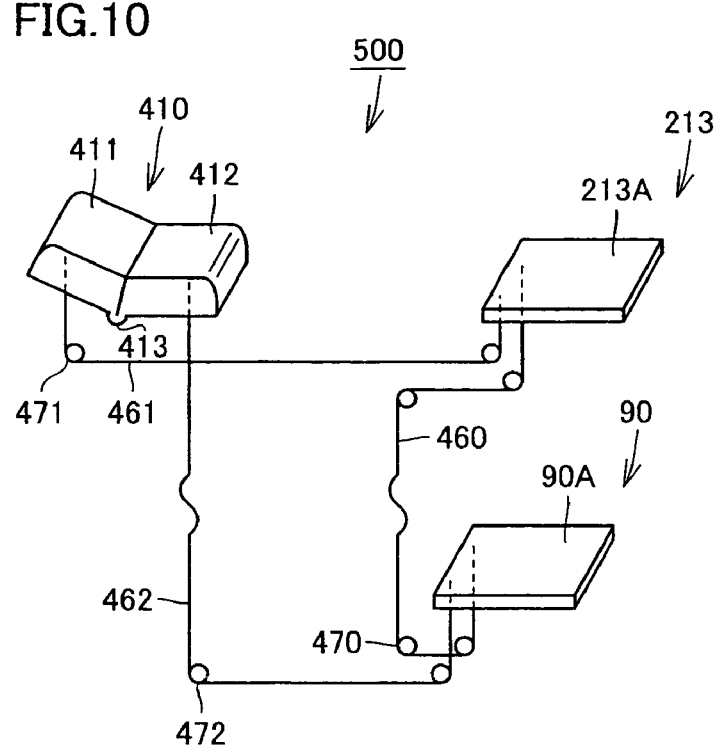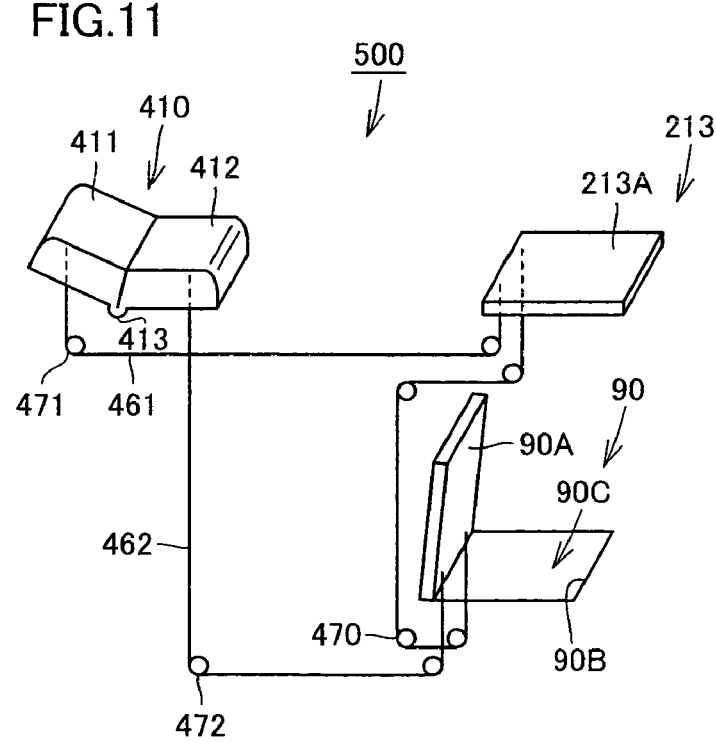

VEHICLE

TECHNICAL FIELD

The present invention relates generally to vehicles and particularly to vehicles supplied with a plurality of types of energy sources.

BACKGROUND ART

In recent years, there have been proposed a variety of environmentally friendly hybrid vehicles, fuel cell vehicles and the like. For example, Japanese Patent No. 3016349 proposes a hybrid vehicle limiting use of fuel. This vehicle limiting use of fuel includes an externally chargeable battery, a driving motor receiving electric power from the battery to drive a wheel, and an internal combustion engine driving an electric power generator capable of supplying the driving motor with electric power. Further, the vehicle limiting use of fuel includes means for detecting how an amount of fuel used by the internal combustion engine varies after external charging means charges. When a parameter from the means for detecting attains a predetermined value, the motor's output is limited to guide a driver to provide guidance to allow the driver to run the vehicle without relying on the internal combustion engine.

Japanese Patent Laying-Open No. 2005-093316 describes a fuel cell vehicle including a fuel cell device receiving fuel from a fuel tank and air from a source of air to generate electricity therefrom by a fuel cell, a battery, and a motor.

Furthermore, Japanese Patent Laying-Open No. 06-135302 proposes a vehicular service station including facilities allowing electric vehicles, gasoline vehicles and the like to be refueled, and facilities allowing electric vehicles to be charged. This service station is provided with an air curtain and includes an exhaust port exhausting upwards a gas generated while the vehicle is charged. The service station can thus exhaust a vaporized gas generated while a vehicle is fueled, a gas generated while a vehicle is charged, and the like.

Japanese Patent Laying-Open No. 11-078527 describes a vehicle that can reduce or prevent interference of a sliding door with a fuel lid, a fueling gun and the like.

Patent Document 1: Japanese Patent No. 3016349

Patent Document 2: Japanese Patent Laying-Open No. 2005-093316

Patent Document 3: Japanese Patent Laying-Open No. 06-135302

Patent Document 4: Japanese Patent Laying-Open No. 11-078527

DISCLOSURE OF THE INVENTION

Problems to be Solved by the Invention

If the above hybrid vehicle is charged and refueled by an operator simultaneously, the operator is required to do a variety of operations simultaneously, and the operator may frequently make mistakes in the operations. Furthermore, neither Japanese Patent Laying-Open No. 2005-093316 nor Japanese Patent Laying-Open No. 6-135302 discloses or suggests any proposal in view of reducing or preventing an erroneous operation done by an operator charging/refueling a vehicle.

The present invention has been made in view of such a disadvantage as described above, and it contemplates a vehicle that can reduce a mistake made by an operator in charging/refueling a vehicle.

Means for Solving the Problems

The present invention provides a vehicle comprising: a first drive unit driven by a first energy source; a first storage unit capable of storing the first energy source; a first energy receiving unit having a first energy supply unit attachably and detachably connected thereto, and receiving the first energy source; a first lid member capable of opening and closing an opening of a first compartment accommodating the first energy receiving unit; and a first connection unit connected to the first energy receiving unit and guiding to the first storage unit the first energy source received by the first energy receiving unit. The present vehicle comprises: a second drive unit driven by a second energy source different from the first energy source; a second storage unit storing the second energy source therein; a second energy receiving unit having a second energy supply unit attachably and detachably connected thereto, and receiving the second energy source; a second lid member capable of opening and closing an opening of a second compartment accommodating the second energy receiving unit; and a second connection unit connected to the second energy receiving unit and passing the second energy source received by the second energy receiving unit. The present vehicle further comprises an open/close control mechanism holding the other of the first lid member and the second lid member in a closed position when one of the first lid member and the second lid member is set in an open position.

Preferably, the open/close control mechanism includes: a first detection unit detecting that the first lid member is in the open/closed position; a second detection unit detecting that the second lid member is in the open/closed position; a first lock unit holding the first lid member in the closed position; a second lock unit holding the second lid member in the closed position; a first disengagement unit capable of disengaging the first lid member locked by the first lock unit in the closed position from the closed position; a second disengagement unit capable of disengaging the second lid member locked by the second lock unit in the closed position from the closed position; and a control unit operative in response to the first detection unit detecting that the first lid member is in the open position for prohibiting driving the second disengagement unit, and operative in response to the second detection unit detecting that the second lid member is in the open position for prohibiting driving the first disengagement unit.

Preferably, the first energy source is fuel. The first storage unit is a fuel tank storing the fuel therein in a form of liquid. The first connection unit is a piping guiding the fuel in the form of liquid from the first energy receiving unit to the fuel tank. The second energy source is electric power. The second storage unit is a power storage device storing direct current electric power as the second energy source. The second connection unit is a line passing electric power.

Preferably, the second drive unit is a rotating electric machine driven by the second energy source of alternate current electric power, and the rotating electric machine includes a first rotating electric machine having a first multiphase winding and a first neutral point of the first multiphase winding, and a second rotating electric machine having a second multiphase winding and a second neutral point of the second multiphase winding. Furthermore, the second connection unit includes a first line connected to the first neutral point and a second line connected to the second neutral point. The vehicle further comprises: a first inverter receiving the second energy source of direct current electric power from the power storage device, converting the second energy source of direct current electric power to the second energy source of alternate current electric power, and supplying the second energy source of alternate current electric power to the first rotating electric machine; a second inverter receiving the second energy source of direct current electric power from the power storage device, converting the second energy source of direct current electric power to the second energy source of alternate current electric power, and supplying the second energy source of alternate current electric power to the second rotating electric machine; and an inverter control unit controlling the first and second inverters to convert alternate current electric power provided from the second connection unit to the first and second neutral points to direct current electric power and supply the direct current electric power to the power storage device.

Preferably, the second drive unit is a rotating electric machine driven by the second energy source of alternate current electric power. The rotating electric machine includes a first rotating electric machine having a first multiphase winding and a first neutral point of the first multiphase winding, and a second rotating electric machine having a second multiphase winding and a second neutral point of the second multiphase winding. The second connection unit includes a first line connected to the first neutral point and a second line connected to the second neutral point. The vehicle further comprises: a first inverter receiving the second energy source of direct current electric power from the power storage device, converting the second energy source of direct current electric power to the second energy source of alternate current electric power, and supplying the second energy source of alternate current electric power to the first rotating electric machine; a second inverter receiving the second energy source of direct current electric power from the power storage device, converting the second energy source of direct current electric power to the second energy source of alternate current electric power, and supplying the second energy source of alternate current electric power to the first rotating electric machine; and an inverter control unit controlling the first and second inverters to convert direct current electric power supplied from the power storage device to the first and second inverters to alternate current electric power and supply the alternate current electric power through the second connection unit to an external load.

Preferably, the open/close control mechanism includes a coupling member coupling the first lid member and the second lid member and interlocking the first lid member and the second lid member to prevent the first lid member and the second lid member from both assuming the open position.

Preferably, the coupling member includes a wire coupling the first lid member and the second lid member. Preferably, the open/close control mechanism includes an operation mechanism switchable between a first position that allows the first lid member to be operable to be opened/closed and sets the second lid member in the closed position, and a second position that allows the second lid member to be operable to be opened/closed and sets the first lid member in the closed position. The operation mechanism includes an operation portion switchable by a user, a coupling member for a first operation coupling the operation portion and the first lid member, and a coupling member for a second operation coupling the operation portion and the second lid member. The operation mechanism is set in the first position to: provide the coupling member for the first operation with a slack to allow the first lid member to be operable to be opened/closed; and also reduce a slack of the coupling member for the second operation to set the second lid member in the closed position. The operation mechanism is set in the second position to: reduce the slack of the coupling member for the first operation to set the first lid member in the closed position; and also provide the coupling member for the second operation with the slack to allow the second lid member to be operable to be opened/closed.

Preferably, the operation portion includes a rotatably provided rotation member, and an axial portion rotatably supporting the rotation member. The coupling member for the first operation is connected to the rotation member at a portion remote from the axial portion, and the coupling member for the second operation is connected to the rotation member at a portion located opposite to the portion having the coupling member for the first operation connected thereto with the axial portion posed therebetween.

The present invention provides a vehicle comprising: a first drive unit driven by a first energy source; a first storage unit capable of storing the first energy source; a first energy receiving unit having a first energy supply unit capable of supplying first energy attachably and detachably connected thereto, and receiving the first energy source; a first lid member capable of opening and closing an opening of a first compartment accommodating the first energy receiving unit; a first connection unit connected to the first energy receiving unit and guiding to the first storage unit the first energy source received by the first energy receiving unit; a second drive unit driven by a second energy source different from the first energy source; a second storage unit storing the second energy source therein; a second energy receiving unit having a second energy supply unit attachably and detachably connected thereto, and receiving the second energy source; a second lid member capable of opening and closing an opening of a second compartment accommodating the second energy receiving unit; a second connection unit connected to the second energy receiving unit and passing the second energy source received by the second energy receiving unit; an open/close control device controlling opening/closing the first lid member and the second lid member; and an output unit including an alarm unit performing an alarm operation. The open/close control device includes a unit for determining whether the lids are open/closed, determining whether the first lid member and the second lid member are in an open position or a closed position, and an output unit driving unit driving the output unit in accordance with open/close information received from the unit for determining whether the lids are open/closed. The output unit driving unit drives the alarm unit when at least one of the first lid member and the second lid member is in the open position, and the output unit driving unit stops driving the alarm unit when the first lid member and the second lid member are both set in the closed position.

Preferably, the output unit includes a first lid driving unit driving the first lid member in the open position to set the first lid member in the closed position, and a second lid driving unit driving the second lid member in the open position to set the second lid member in the closed position. The open/close control device includes a connection/disconnection determination unit for determining whether the first energy receiving unit has the first energy supply unit connected thereto/disconnected therefrom and whether the second energy receiving unit has the second energy supply unit connected thereto/disconnected therefrom, and for accordingly transmitting connection/disconnection information to the output unit driving unit. The output unit driving unit drives the first and second lid driving units when the first lid member and the second lid member are in the open position, the first energy receiving unit does not have the first energy supply unit connected thereto, and the second energy receiving unit does not have the second energy supply unit connected thereto.

Furthermore, the output unit driving unit drives the first lid driving unit when the first lid member and the second lid member are in the open position, the first energy receiving unit does not have the first energy supply unit connected thereto, and the second energy receiving unit has the second energy supply unit connected thereto. The output unit driving unit drives the second lid driving unit when the first lid member and the second lid member are in the open position, the first energy receiving unit has the first energy supply unit connected thereto, and the second energy receiving unit does not have the second energy supply unit connected thereto.

Preferably, the open/close control device includes a first measurement unit measuring a period of time for which the first lid member is in the open position, and transmitting first measurement information to the output unit driving unit, and a second measurement unit measuring a period of time for which the second lid member is in the open position, and transmitting second measurement information to the output unit driving unit. Furthermore, the output unit includes a first lid driving unit driving the first lid member to set the first lid member in the closed position, and a second lid driving unit driving the second lid member to set the second lid member in the closed position. The open/close control device includes a connection/disconnection determination unit for determining whether the first energy receiving unit has the first energy supply unit connected thereto/disconnected therefrom and whether the second energy receiving unit has the second energy supply unit connected thereto/disconnected therefrom, and for accordingly transmitting connection/disconnection information to the output unit driving unit. Furthermore, the output unit driving unit drives the first lid driving unit when the first lid member is in the open position continuously for a predetermined period of time, the second lid member is in the closed position continuously for the predetermined period of time, and the first energy receiving unit continuously for the predetermined period of time does not have the first energy supply unit connected thereto. The output unit driving unit drives the second lid driving unit when the second lid member is in the open position continuously for a predetermined period of time, the first lid member is in the closed position continuously for the predetermined period of time, and the second energy receiving unit continuously for the predetermined period of time does riot have the second energy supply unit connected thereto.

Preferably, the open/close control device includes a third measurement unit measuring a driving time of the first lid driving unit and transmitting third measurement information to the output unit driving unit, and a fourth measurement unit measuring a driving time of the second lid driving unit and transmitting fourth measurement information to the output unit driving unit. When the driving time of the first lid driving unit is larger than a predetermined time the output unit driving unit stops driving the first lid driving unit and drives the alarm unit. When the driving time of the second lid driving unit is larger than a predetermined time the output unit driving unit stops driving the second lid driving unit and drives the alarm unit.

Effects of the Invention

The present vehicle can thus prevent an operator from performing refueling and charging operations simultaneously and hence reduce a mistake made by the operator in the operations.

BRIEF DESCRIPTION OF THE DRAWINGS

FIG. 10 is a schematic diagram of the open/close control mechanism with a switching piece set off and a switching piece set on to close both the lid member and a lid member.

FIG. 11 is a schematic diagram of the open/close control mechanism with a switching piece set off and a switching piece set on to open a lid member.

DESCRIPTION OF THE REFERENCE SIGNS

2F: front wheel, 3: power split device, 4: engine, 10: voltage sensor, 20: boost converter, 30, 40: inverter, 61, 62: terminal, 70: control device, 90: charging/power feeding unit, 90C: accommodation room, 95: lock mechanism, 96, 217: unit allowing a lid member to be operable to be opened, 97: sensor, 100: hybrid vehicle, 100A, 100B: side surface, 190: connector, 191: refueling connector, 200: vehicular main body, 201: fuel tank, 213: refueling unit, 213A: lid member, 213B: opening, 213C: accommodation room, 214: connection pipe, 215: nozzle receiving unit, 216: lock mechanism, 217: unit allowing a lid member to be operable to be opened, 218: sensor, 220, 230: lock mechanism, 221, 231: hook member, 222, 232, 454, 455: biasing member, 223, 233, 240, 250: electromagnet, 224, 234: hole, 225, 235, 475: elastic member, 226, 236: terminal portion, 227, 237, 435, 436, 441, 443: switch, 229, 239: disengagement mechanism, 251, 252: power storage device, 260: alarm, 261: line, 262, 452, 453, 453: connection piece, 263: elastic member, 265: switching mechanism, 270: alarm device, 280: timer, 300: front bumper, 301: front fender, 303: rear fender, 304: rear bumper, 307: hood, 312: front door, 313: rear door, 410: operation unit, 411, 412, 437, 438: switching piece, 413, 434: axial portion, 420, 430: switch, 431, 433, 440, 442: projection, 445, 446: motor, 450, 451: closing mechanism, 460, 461, 462: wire, 470: roller, 474: tension roller, 480, 481, 482, 483: alarm unit, 500, 500A: open/close control mechanism, 601, 602: insertion sensor, 603, 604: motor, 610: unit for determining whether the lids are open/closed, 620: unit for determining whether a plug has been inserted, 630: drive control unit, 631: unit for determining whether a state continues for a predetermined period of time, 632: final processing unit, 633: unit for determining an initial state, 634: unit for determining a closed position, 641, 642: alarm display.

BEST MODES FOR CARRYING OUT THE INVENTION

Hereinafter the present invention in embodiments will be described with reference to FIGS. 1-24.

If an embodiment described below refers to numbers, amounts and the like, the present invention is not necessarily limited in scope to such numbers, amounts or the like, unless otherwise specified. Furthermore, the embodiment describes components, which are not necessarily essential to the present invention, unless otherwise specified. Furthermore, if there is more than one embodiment hereinafter, each embodiment is originally intended to have a characteristic portion thereof combined with that of another embodiment, as appropriate, unless otherwise specified.

First Embodiment

Figure 1:
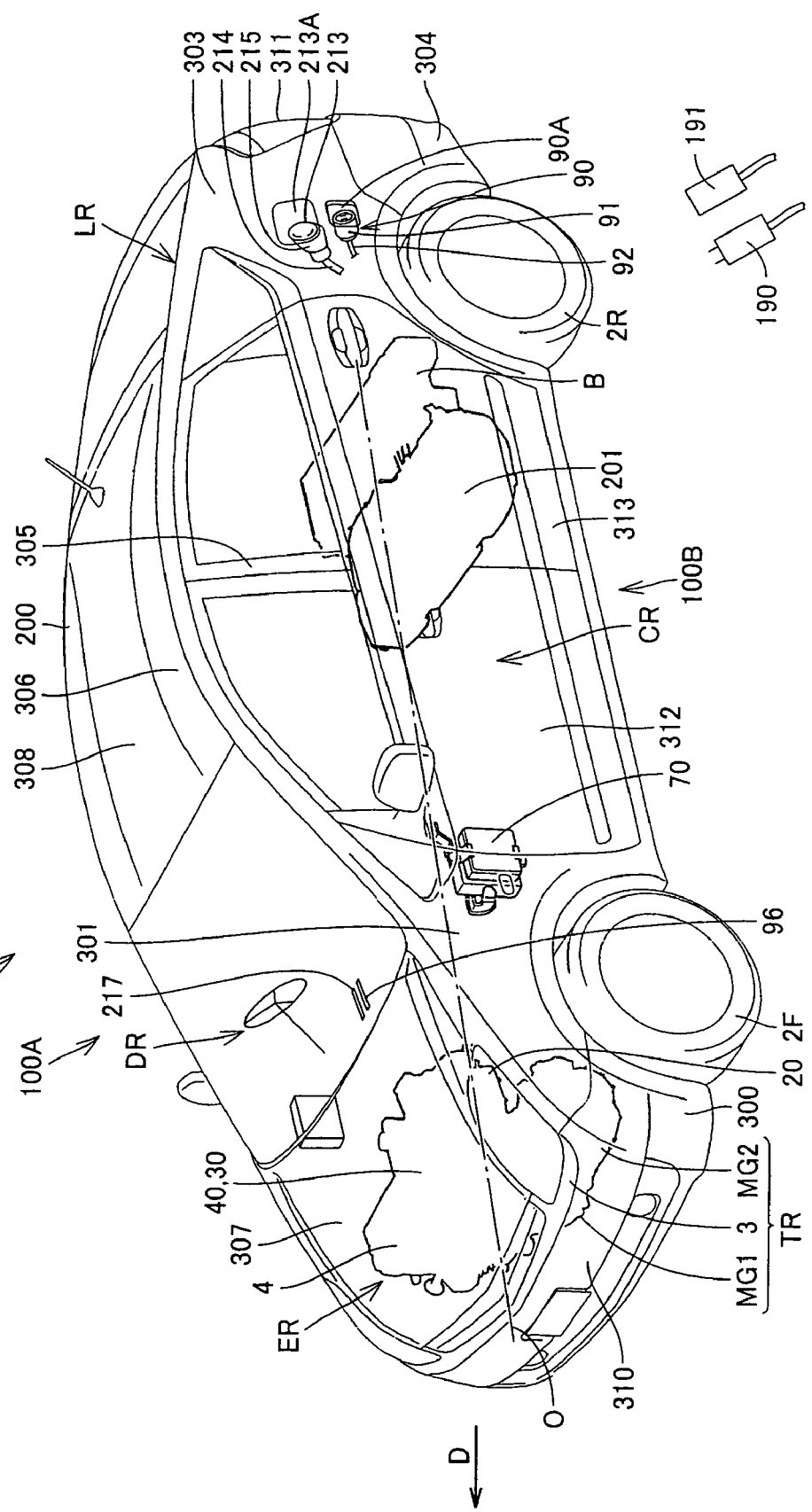
FIG. 1 is a perspective view generally showing a configuration of a hybrid vehicle of the present invention in a first embodiment.

With reference to FIG. 1 to FIG. 5, the present invention in a first embodiment provides a hybrid vehicle 100, as will be described hereinafter. FIG. 1 is a perspective view generally showing a configuration of hybrid vehicle 100 of the present invention in the first embodiment.

In FIG. 1, hybrid vehicle 100 includes a vehicle main body 200 constituted of a body and exterior parts, and a pair of front wheels 2F and a pair of rear wheels 2R provided at a front side and a rear side, respectively, of hybrid vehicle 100, as seen in a direction D in which hybrid vehicle 100 travels.

Vehicular main body 200 includes an engine compartment ER provided at a front side in direction D in which hybrid vehicle 100 travels, an occupant accommodation room CR adjacent to engine compartment ER rearwardly of engine compartment ER in direction D in which hybrid vehicle 100 travels, and a luggage room LR adjacent to occupant accommodation room CR rearwardly of occupant accommodation room CR in direction D in which hybrid vehicle 100 travels.

The vehicular main body 200 body is implemented for example as a monocoque body. A plurality of exterior parts are mounted on a surface of the body to configure vehicular main body 200.

The exterior parts for example include a front bumper 300 provided to vehicular main body 200 at a front side, a front fender 301, and pivotable front and rear doors 312 and 313.

The exterior parts also include a hood 307 as an upper lid of engine compartment ER, a rear fender 303 provided rearwardly of rear door 313, as seen in direction D in which the vehicle travels, and a rear bumper 304 provided below rear fender 303.

In a portion located below the rear seat in occupant accommodation room CR, a fuel tank 201 which accommodates liquid fuel (a first energy source) such as gasoline is provided, and a chargeable/dischargeable battery B, such as a secondary battery or a large-capacity capacitor, capable of charging/discharging electric power (a second energy source) is arranged in hybrid vehicle 100 rearwardly of the rear seat.

In engine compartment ER are included a transaxle TR, and an engine 4 serving as an internal combustion engine generating power driving front wheel 2F.

Transaxle TR includes rotating electric machines (motor generators) MG1, MG2 functioning as a motor driving front wheel 2F and as a power generator, a boost converter 20, inverters 30, 40, and a power split device 3 such as a planetary gear. Boost converter 20 receives electric power from battery B, boosts the electric power and supplies the electric power to rotating electric machines MG1, MG2 via inverters 30, 40, and receives electric power generated by rotating electric machines MG1, MG2, down-converts the electric power and charges battery B with the electric power.

Inverters 30, 40 receives direct current (dc) electric power from battery B, converts the dc electric power to 3-phase alternate current (ac) electric power and supplies the ac electric power to rotating electric machines MG1, MG2, and receives electric power generated by rotating electric machines MG1, MG2 and converts the electric power to dc electric power.

In occupant accommodation room CR an electronic control unit (ECU) or a similar control device 70 is provided, and inverters 30, 40 are driven by a signal PWM issued from control device 70.

Hybrid vehicle 100 is provided with a charging/power feeding unit (a second energy source receiving unit) 90 and a refueling unit (a first energy receiving unit) 213 at a peripheral side surface 100B opposite to a peripheral side surface 100A corresponding to the driver's seat DR side, as seen in a widthwise direction of hybrid vehicle 100. Note that while in the FIG. 1 example charging/power feeding unit 90 and refueling unit 213 are both provided at a single, side surface 100B, the units may alternatively be provided at different side surfaces 100A, 100B, respectively. Furthermore, one of charging/power feeding unit 90 and refueling unit 213 may be provided at front fender 301 and the other may be disposed at rear fender 303.

Figure 2:
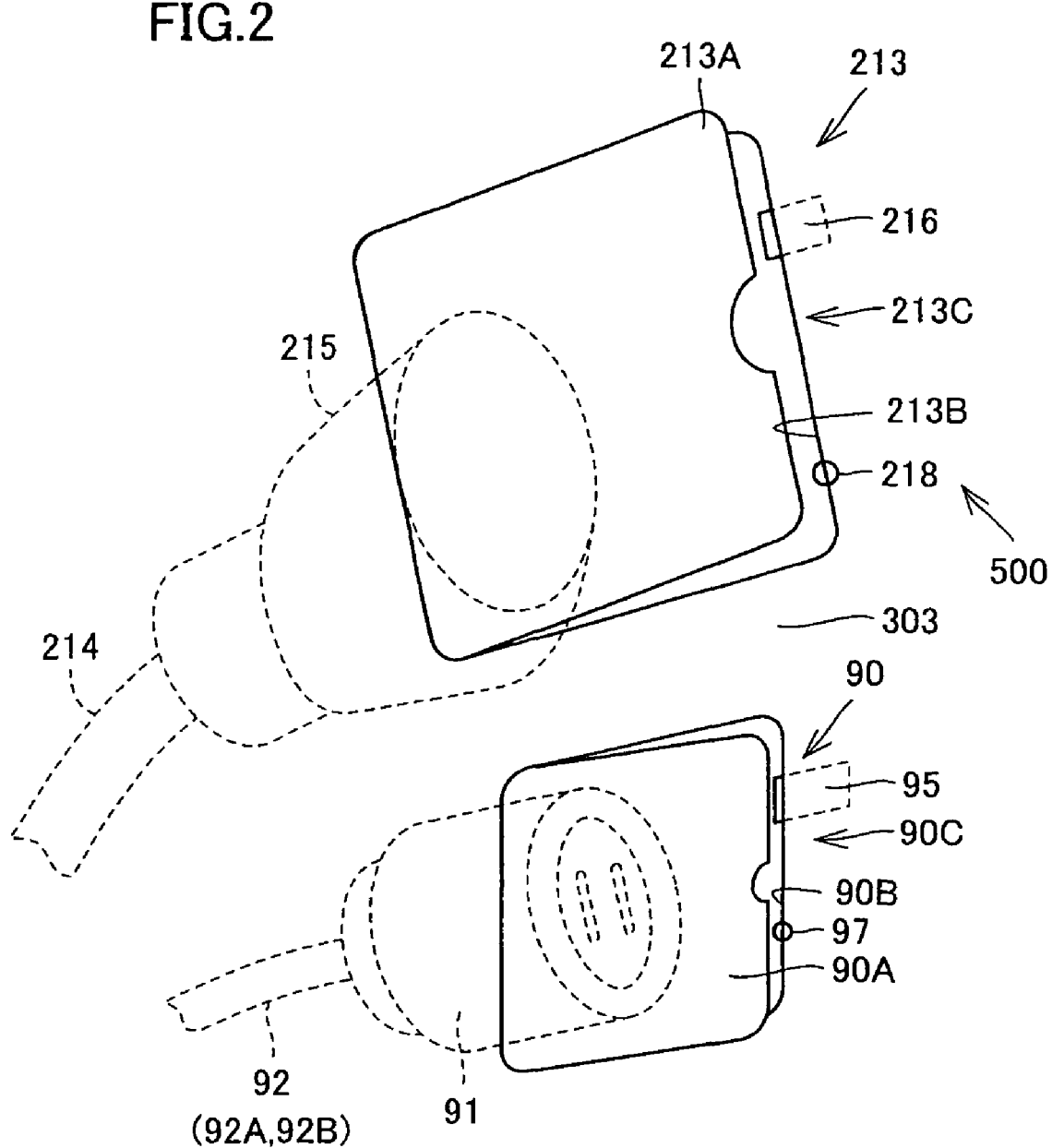
FIG. 2 is a perspective view of a charging/power feeding unit and a refueling unit.

FIG. 2 is a perspective view of charging/power feeding unit 90 and refueling unit 213. As shown in FIG. 2, refueling unit (the first energy receiving unit) 213 includes a nozzle receiving unit 215 provided to vehicular main body 200 and capable of receiving a nozzle of a refueling connector 191, and a connection pipe 214 connected to nozzle receiving unit 215 and fuel tank 201. Furthermore, refueling unit 213 includes a lid member 213A provided at rear fender 303. Nozzle receiving unit 215 is formed in vehicular main body 200 and accommodated in an accommodation room 213C having an opening 213B at rear fender 303. Lid member 213A is provided at rear fender 303 pivotably to be capable of opening/closing opening 213B.

Charging/power feeding unit 90 includes an insertion unit 91 provided to vehicular main body 200, and a lid member 90A provided at rear fender 303 and externally exposing and accommodating insertion unit 91 in vehicular main body 200. Furthermore, charging/power feeding unit 90 includes a line 92A, 92B connected to insertion unit 91 and connected to each neutral point of rotating electric machines MG1, MG2 shown in FIG. 1. Insertion unit 91 is connectable to a connector (a second energy supply unit) 190. Insertion unit 91 is accommodated in an accommodation room 90C having an opening 90B formed at rear fender 303. Lid member 90A is provided at rear fender 303 pivotably to be capable of opening/closing opening 90B.

Hybrid vehicle 100 includes an open/close control mechanism 500 setting one of lid member 90A and lid member 213A in a closed position when the other is set in an open position.

Open/close control mechanism 500 includes control device 70, a lock mechanism 216 controlled by control device 70 to be driven, and holding lid member 213A in the closed position, a sensor 218 capable of detecting whether lid member 213A is in the open or closed position, and a unit 217 provided at driver's seat DR and disengaging lock mechanism 216 from a locking position to allow lid member 213A to be pivotable to be operable to be opened.

For example when a refueling operation is to be performed, unit 217 allowing a lid member to be operable to be opened, as shown in FIG. 1, is operated to disengage lid member 213A from a locked position. Thereafter the operator pivots lid member 213A and inserts refueling connector 191 into nozzle receiving unit 215 to supply fuel. Refueling unit 213 receives gasoline or similar fuel which is in turn passed through connection pipe 214 and thus reserved in fuel tank 201. Note that while in the present, first embodiment gasoline is used, for example any of light oil, compressed natural gas (CNG), and hydrogen may alternatively be used.

Furthermore, open/close control mechanism 500 includes a lock mechanism 95 controlled by control device 70 to be driven, and holding lid member 90A in the closed position, a sensor 97 detecting whether lid member 90A is in the open or closed position, and a unit 96 provided at driver's seat DR and disengaging lock mechanism 95 from a locking position to allow lid member 90A to be pivotable to be operable to be opened.

Note that connector 190 connected to insertion unit 91 includes a charging connector, a power feeding connector, and a charging/power feeding connector. The charging connector is a connector for charging electric power supplied from a commercial power supply (e.g. a single-phase alternating current of 100V in Japan). For example, the charging connector is a plug connected to a household power supply of general household.

The power feeding connector is a connector for receiving electric power (e.g. a single-phase alternating current of 100V in Japan) from hybrid vehicle 100 and supplying the electric power to an external load. The charging/power feeding connector is a connector having both the function of the charging connector and that of the power feeding connector, and capable of charging electric power supplied from a commercial power supply and also capable of receiving electric power from hybrid vehicle 100 and supplying the electric power to an external load.

Note that connector 190 and charging/power feeding unit 90 may communicate electric power therebetween such that a portion of connector 190 and at least a portion of charging/power feeding unit 90 contact each other directly, i.e., contactively, or inductively. Note that connector 190 and refueling connector 191 are separate, mutually independent members.

When battery B is to be charged, the electric power stored in battery B is to be supplied to an external load, or the like, unit 96 allowing a lid member to be operable to be opened is initially operated to disengage lid member 90A from the locked position and an operator pivots lid member 90A. Thereafter connector 190 is connected to insertion unit 91, and via rotating electric machines MG1, MG2 and inverters 30, 40 shown in FIG. 1 battery B is charged or the electric power of battery B is charged to an external load.

Figure 3:
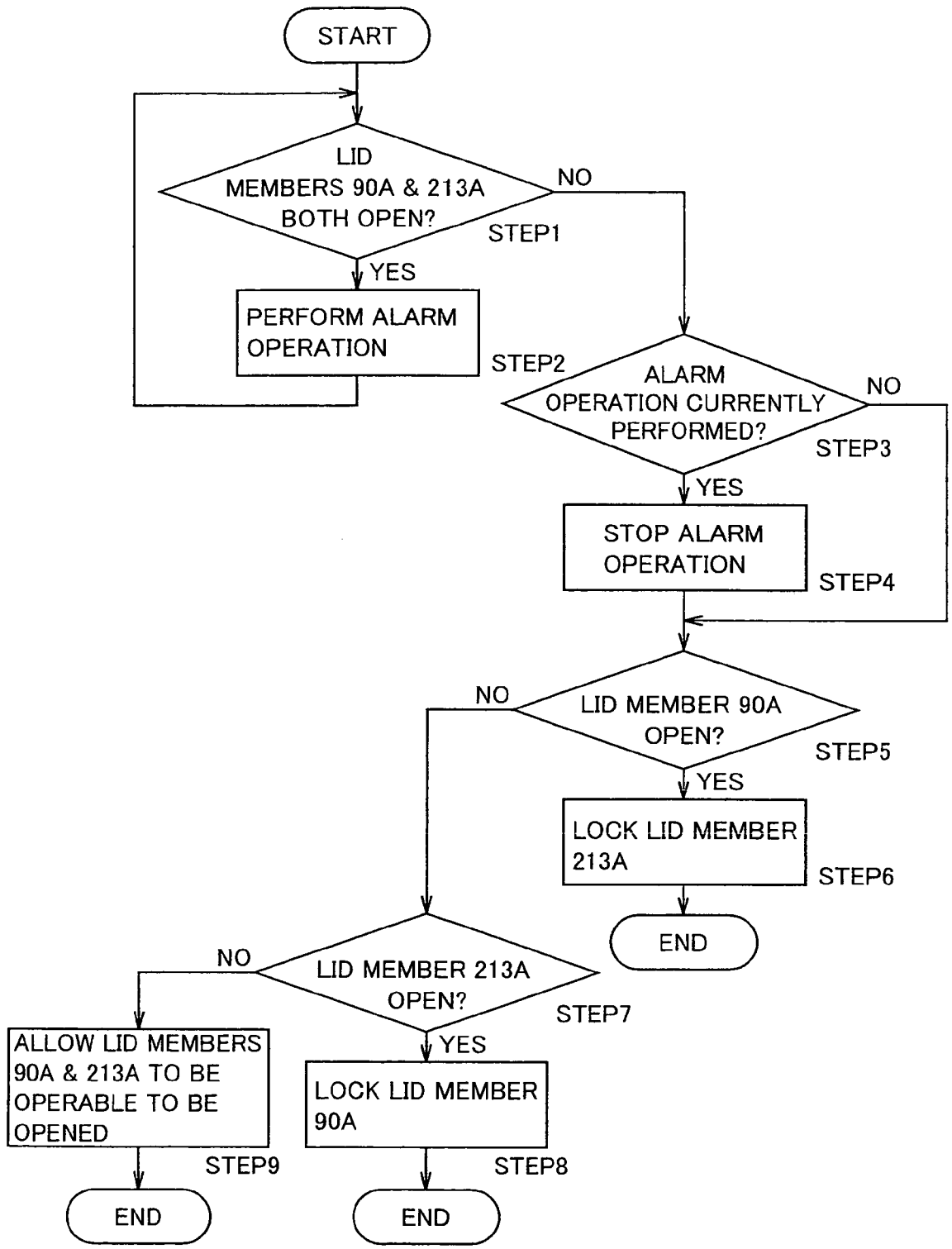
FIG. 3 is a flowchart of controlling a lock mechanism and a lock mechanism.

FIG. 3 is a flowchart of controlling lock mechanism 95 and lock mechanism 216. In FIG. 3, control device 70 operates in response to signals received from sensors 97, 218 to determine whether lid members 90A, 213A are each in the open or closed position.

Initially, control device 70 determines whether lid members 90A, 213A are both in their respective open positions (STEP 1). If so, an alarming sound is issued, an alarm lamp is turned on, or a similar alarm operation is activated.

If control device 70 determines that at least one of lid members 90A, 213A is in the closed position, control device 70 determines whether the alarm operation continues (STEP 2). If so, the alarm operation is stopped (STEP 4).

Control device 70 determines whether lid member 90A is in the open position (STEP 5). If so, control device 70 prohibits the operation of unit 217 allowing a lid member to be operable to be opened and causes lock mechanism 216 to hold lid member 213A in the locked position (STEP 6). Note that the operation of unit 217 allowing a lid member to be operable to be opened is prohibited for example by: locking an operation lever or the like of unit 217 to prevent the operation lever from pivoting while the driver attempts to pivot it; preventing disengaging lock mechanism 216 from the locking position even if the operation lever is operated; or the like.

If control device 70 determines that lid member 90A is in the closed position, control device 70 determines whether lid member 213A is in the open position (STEP 7). If so, lid member 90A is locked and thus held in the closed position (STEP 8). Lid member 90A is held in the closed position for example, as follows: lock mechanism 95 locks lid member 90A, and furthermore, an operation lever of unit 96 allowing a lid member to be operable to be opened is locked and thus does not pivot if the driver attempts to pivot the operation lever; if the operation lever is operated, lock mechanism 216 is not disengaged from the locking position; or the like.

If control device 70 determines that lid member 213A is also in the closed position, control device 70 controls units 96, 217 to allow lid member 90A and lid member 213A to be operable to be opened (STEP 9). Note that in doing so, one of lid member 90A and lid member 213A is operable to be opened, and lid member 90A and lid member 213A are not both operable to be opened.

Lid member 90A and lid member 213A thus controlled to be opened/closed can be prevented from both assuming their respective open positions. Lid member 213A and lid member 90A thus prevented from assuming their open positions can prevent an operator from performing charging and refueling operations simultaneously and thus making a mistake in the operations that is attributed to performing the operations simultaneously.

Figure 4:
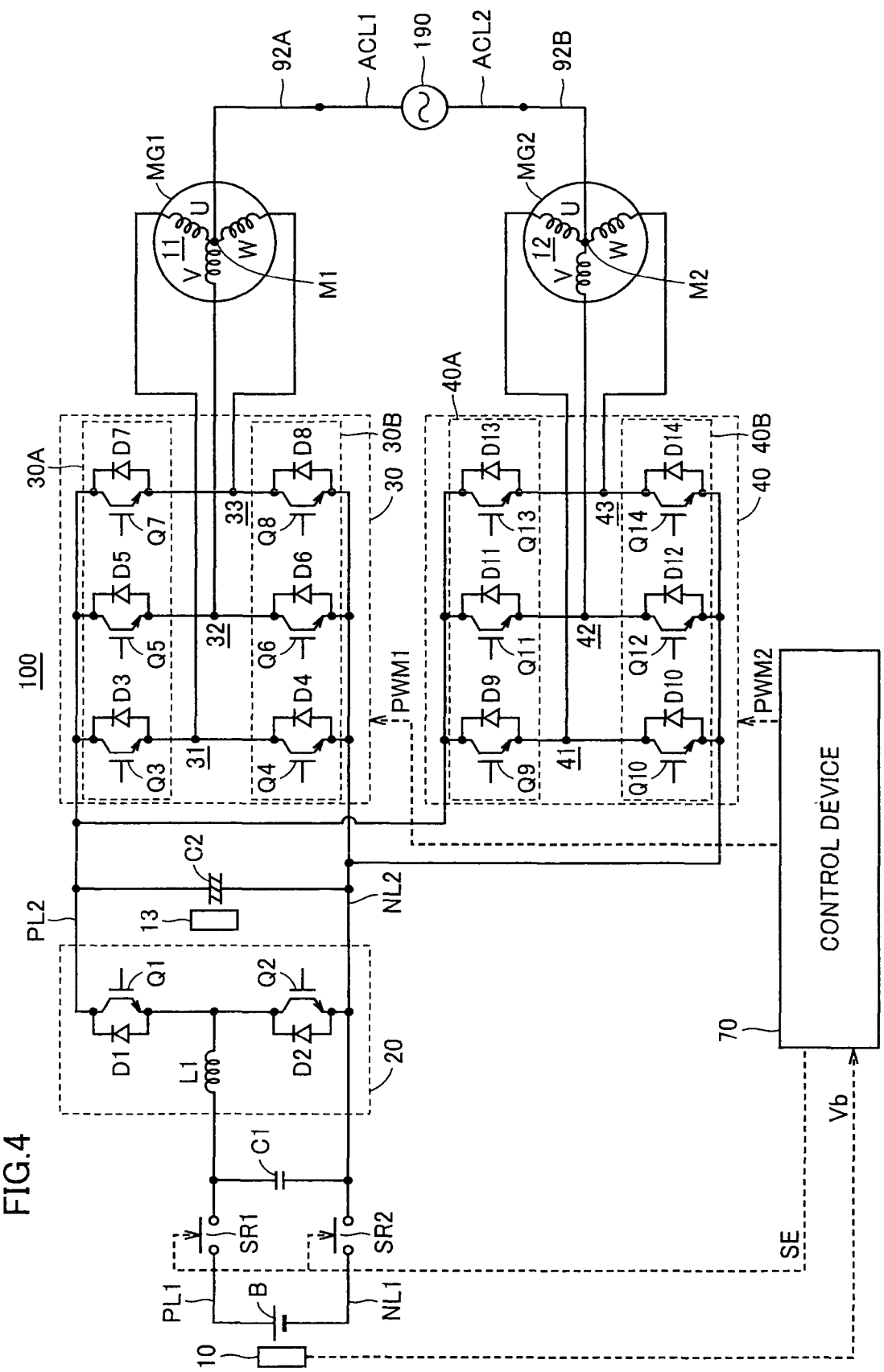
FIG. 4 is a schematic block diagram of the hybrid vehicle of the present invention in the first embodiment.

FIG. 4 is a schematic block diagram of hybrid vehicle 100 according to the first embodiment of the present invention. With reference to FIG. 4, a method of charging battery B with an alternating current provided through connector 190 will be described. A positive electrode of battery B is connected to a positive electrode line PL1, and a negative electrode of battery B is connected to a negative electrode line NL1. Capacitor C1 is connected between positive electrode line PL1 and negative electrode line NL1. Boost converter 20 is connected between positive electrode line PL1 and negative electrode line NL1, and a positive electrode line PL2 and a negative electrode line NL2. Capacitor C2 is connected between positive electrode line PL2 and negative electrode line NL2. Inverter 30 is connected between positive electrode line PL2 and negative electrode line NL2, and rotating electric machine MG1. Inverter 40 is connected between positive electrode line PL2 and negative electrode line NL2, and rotating electric machine MG2.

Rotating electric machine MG1 includes a three-phase coil 11 as a stator coil, and rotating electric machine MG2 includes a three-phase coil 12 as a stator coil.

Boost converter 20 includes a reactor L1, NPN transistors Q1, Q2, and diodes D1, D2.

Inverter 30 is formed of a U-phase arm 31, a V-phase arm 32, and a W-phase arm 33. U-phase arm 31, V-phase arm 32, and W-phase arm 33 are provided in parallel between positive electrode line PL2 and negative electrode line NL2. U-phase arm 31 is formed of NPN transistors Q3, Q4 connected in series. V-phase arm 32 is formed of NPN transistors Q5, Q6 connected in series. W-phase arm 33 is formed of NPN transistors Q7, Q8 connected in series. Further, diodes D3-D8 that allow a current to flow from an emitter side to a collector side are connected between the collectors and the emitters of NPN transistors Q3-Q8, respectively.

Midpoints of U, V, and W-phase arms in inverter 30 are connected to U, V, and W-phase ends of U, V, and W-phase coils in three-phase coil 11 included in rotating electric machine MG1, respectively. In other words, rotating electric machine MG1 is a three-phase permanent magnet motor, and is configured such that one end of each of the three coils of U, V, and W phases is all connected to a neutral point M1. The other end of the U-phase coil is connected to a midpoint between NPN transistors Q3, Q4, the other end of the V-phase coil is connected to a midpoint between NPN transistors Q5, Q6, and the other end of the W-phase coil is connected to a midpoint between NPN transistors Q7, Q8.

Inverter 40 is connected in parallel with inverter 30, between the terminals of capacitor C2. Inverter 40 is formed of a U-phase arm 41, a V-phase arm 42, and a W-phase arm 43. U-phase arm 41, V-phase arm 42, and W-phase arm 43 are provided in parallel between positive electrode line PL2 and negative electrode line NL2.

U-phase arm 41 is formed of NPN transistors Q9, Q10 connected in series. V-phase arm 42 is formed of NPN transistors Q11, Q12 connected in series. W-phase arm 43 is formed of NPN transistors Q13, Q14 connected in series. NPN transistors Q9-Q14 correspond to NPN transistors Q3-Q8 in inverter 30, respectively. In other words, inverter 40 has the same configuration as that of inverter 30. Diodes D9-D14 that allow a current to flow from the emitter side to the collector side are connected between the collectors and the emitters of NPN transistors Q9-Q14, respectively.

Midpoints of U, V, and W-phase arms in inverter 40 are connected to U, V, and W-phase ends of U, V, and W-phase coils in three-phase coil 12 included in rotating electric machine MG2, respectively. In other words, rotating electric machine MG2 is also a three-phase permanent magnet motor, and is configured such that one end of each of the three coils of U, V, and W phases is all connected to a neutral point M2. The other end of the U-phase coil is connected to a midpoint between NPN transistors Q9, Q10, the other end of the V-phase coil is connected to a midpoint between NPN transistors Q11, Q12, and the other end of the W-phase coil is connected to a midpoint between NPN transistors Q13, Q14.

Battery B is made of a secondary battery such as a nickel-hydrogen battery or a lithium-ion battery. Voltage sensor 10 detects a battery voltage Vb output from battery B, and outputs the detected battery voltage Vb to control device 70. System relays SR1, SR2 are turned on/off by a signal SE issued from control device 70. Boost converter 20 boosts the direct-current voltage supplied from capacitor C1 and supplies the boosted direct-current voltage to capacitor C2.

Capacitor C2 smoothes the direct-current voltage provided from boost converter 20, and supplies the smoothed direct-current voltage to inverters 30, 40.

When the direct-current voltage is supplied from capacitor C2, inverter 30 converts the direct-current voltage into an alternating-current voltage and drives rotating electric machine MG1, based on a signal PWM1 from control device 70. Further, during regenerative braking of the hybrid vehicle mounted with a drive power output device, inverter 30 converts an alternating-current voltage generated by rotating electric machine MG1 into a direct-current voltage and supplies the converted direct-current voltage to boost converter 20 via capacitor C2, based on signal PWM1 from control device 70.

When the direct-current voltage is supplied from capacitor C2, inverter 40 converts the direct-current voltage into an alternating-current voltage and drives rotating electric machine MG2, based on a signal PWM2 from control device 70.

Here, in inverters 30, 40 each made of a three-phase bridge circuit, there exist eight patterns of on/off combination in the six transistors. In two out of the eight switching patterns, an interphase voltage becomes zero, and such a voltage state is referred to as a zero voltage vector. Regarding the zero voltage vector, three transistors in the upper arm can be considered as being in the same switching state (all of them are turned on or off), and three transistors in the lower arm can also be considered as being in the same switching state. Therefore, in FIG. 4, the three transistors in the upper arm in inverter 30 are collectively shown as an upper arm 30A, and the three transistors in the lower arm in inverter 30 are collectively shown as a lower arm 30B. Similarly, the three transistors in the upper arm in inverter 40 are collectively shown as an upper arm 40A, and the three transistors in the lower arm in inverter 40 are collectively shown as a lower arm 40B.

As shown in FIG. 4, the zero-phase equivalent circuit can be regarded as a single-phase PWM converter that receives, as an input, single-phase alternating-current electric power provided to neutral points M1, M2 via electric power input lines ACL1, ACL2 of connector 190 and lines 92A, 92B. Therefore, by changing a zero voltage vector in each of inverters 30, 40 and providing switching control such that each of inverters 30, 40 operates as an arm of the single-phase PWM converter, it is possible to convert the alternating-current electric power input through electric power input lines ACL1, ACL2 into direct-current electric power, and output the direct-current electric power to positive electrode line PL2. The converted direct-current voltage is supplied to boost converter 20 via capacitor C2 to charge battery B.

Figure 5:
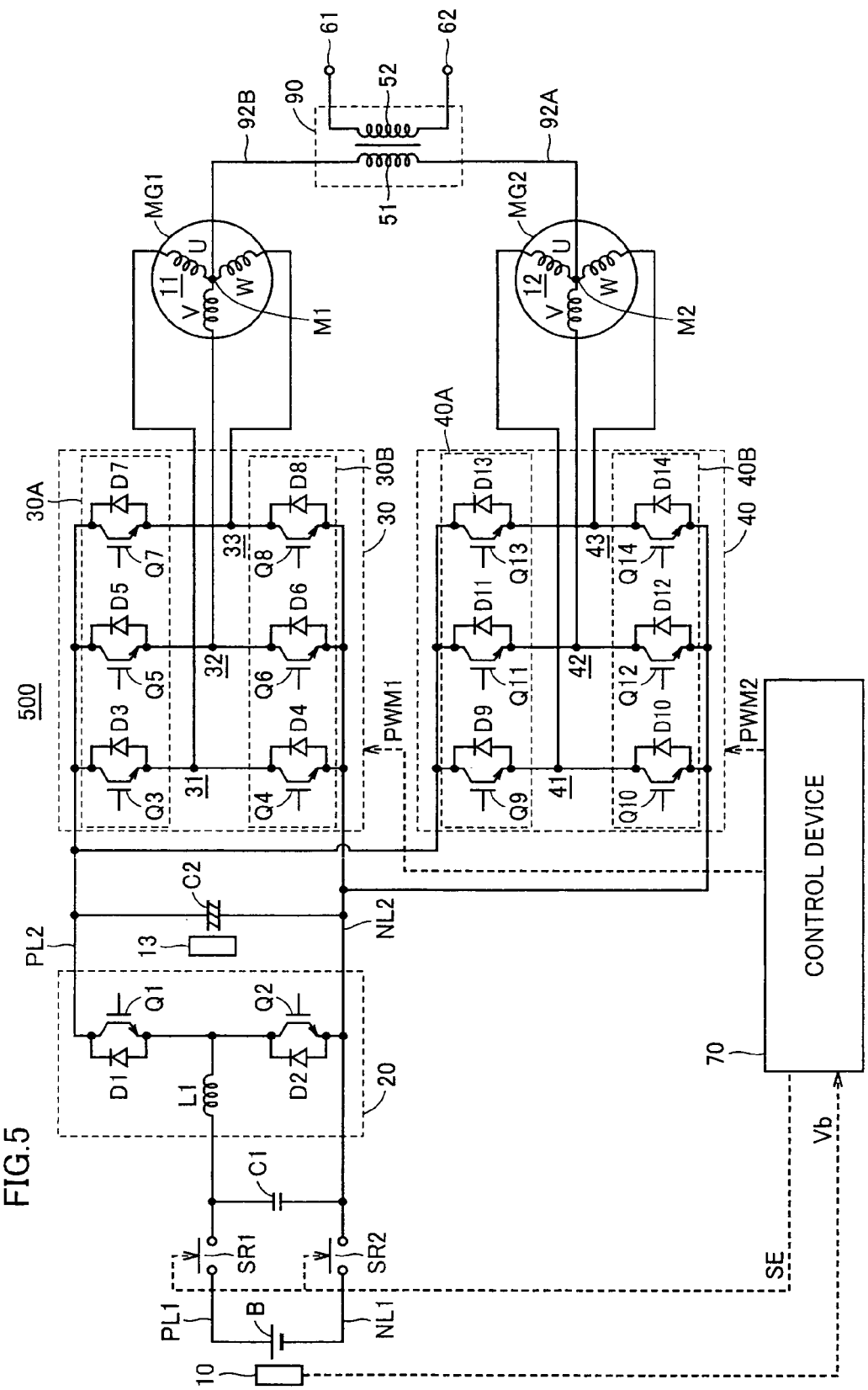
FIG. 5 is a schematic block diagram of a hybrid vehicle for illustrating external charging.

FIG. 5 is a schematic block diagram of a hybrid vehicle for illustrating external charging. In hybrid vehicle 100, connector 190 connected to charging/power feeding unit 90 is identified as a connector for feeding electric power to an outside, capable of supplying electric power with which battery B is charged to an external load.

The connector for feeding electric power to an outside is a connector for supplying electric power from hybrid vehicle 100 (e.g. a single-phase alternating current of 100V in Japan) to an external load.

In FIG. 5, inverters 30, 40 convert direct-current electric power supplied from battery B via boost converter 20 into alternating-current electric power for a commercial power supply and drive rotating electric machines MG1, MG2 such that the alternating-current electric power can be output from charging/power feeding unit 90, in accordance with signals PWM1, PWM2 from control device 70.

Charging/power feeding unit 90 includes a primary coil 51 and a secondary coil 52. Primary coil 51 is connected between neutral point M1 of three-phase coil 11 included in rotating electric machine MG1 and neutral point M2 of three-phase coil 12 included in rotating electric machine MG2. Charging/power feeding unit 90 converts an alternating-current voltage generated between neutral point M1 of rotating electric machine MG1 and neutral point M2 of rotating electric machine MG2 into an alternating-current voltage for a commercial power supply, and outputs the alternating-current voltage from terminals 61, 62 of charging/power feeding unit 90.

Note that while the FIGS. 1-5 example has been described with a hybrid vehicle applied, it is not limited thereto and is applicable for example to a fuel cell vehicle.

That is, the fuel cell vehicle has also a fuel feeding connector and an electricity passing connector connected thereto to supply fuel for generating hydrogen, and supply battery B with electric power and supply an external load with the electric power stored in battery B.

An operator performing a refueling operation and a charging/power feeding operation can thus be prevented from performing these operations simultaneously.

Figure 6:
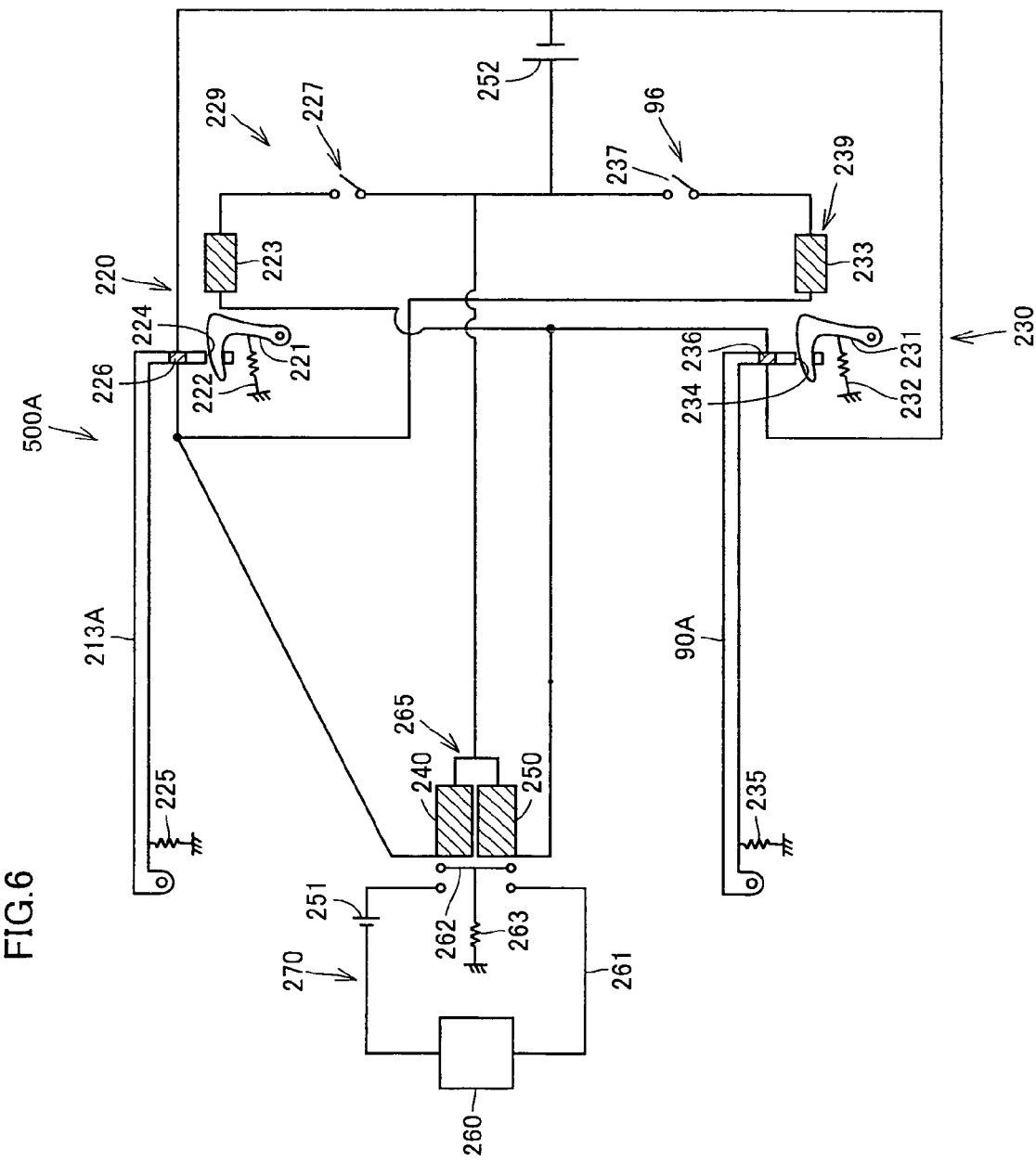
FIG. 6 is a circuit diagram of an open/close control mechanism in an exemplary variation.

FIG. 6 is a circuit diagram of an open/close control mechanism in an exemplary variation. In the FIG. 6 example, an open/close control mechanism 500A includes a lock mechanism 220 capable of holding lid member 213A in the closed position, a disengagement mechanism 229 capable of disengaging lock mechanism 220 from a locking position, a lock mechanism 230 capable of holding lid member 90A in the closed position, and a disengagement mechanism 239 capable of disengaging lock mechanism 230 from a locking position. Lid member 213A is provided to vehicular main body 200 rotatably and lid member 213A is biased by a coil spring or a similar elastic member 225 to open.

Lock mechanism 220 includes a hook member 221 having a portion inserted in a hole 224 formed in lid member 213A, and a biasing member 222 biasing hook member 221. Hook member 221 is provided to vehicular main body 200 rotatably and biased by biasing member 222 to have a portion inserted in hole 224.

Hook member 221 has a curved upper surface. When lid member 213A in the open position pivots to be closed and thus has an end portion abutting against hook member 221 at the upper surface, hook member 221 rotates against a biasing force exerted by biasing member 222 and thus recedes from lid member 213A.

Lid member 213A pivots and has hole 224 positioned at a tip of hook member 221. Hook member 221 thus has the tip entering hole 224 and lid member 213A is thus locked in the closed position.

Similarly, lock mechanism 230 includes a hook member 231 having a tip inserted in a hole 234 formed in lid member 90A, and a biasing member 232 biasing hook member 231. Hook member 231 is provided to vehicular main body 200 rotatably and biased by biasing member 232 to have the tip inserted in hole 234.

Hook member 231 has a curved upper surface. When lid member 90A in the open position pivots to be closed and thus has the end portion abutting against hook member 231 at the upper surface, hook member 231 rotates against a biasing force exerted by biasing member 232 and thus recedes from lid member 90A.

Lid member 90A further pivots and has hole 234 positioned at the tip of hook member 231. Biasing member 232 exerts a biasing force and hook member 231 accordingly rotates. Hook member 231 thus has the tip entering hole 234 and lid member 90A is thus locked in the closed position.

Disengagement mechanism 229 includes an electromagnet 223 receiving electric power from a power storage device 252 to rotate hook member 221 against the biasing force exerted by biasing member 222, and a switch 227 operated to connect/disconnect electromagnet 223 and power storage device 252.

Electromagnet 223 receives electric power to attract hook member 221 to draw out the tip of hook member 221 from hole 224. This disengages lid member 213A from the locked position and furthermore elastic member 225 exerts a biasing force and lid member 213A accordingly assumes a half open position.

Disengagement mechanism 239 includes an electromagnet 233 receiving electric power from power storage device 252 to rotate hook member 231 against the biasing force exerted by biasing member 232, and a switch 237 operated to connect/disconnect electromagnet 233 and power storage device 252.

Electromagnet 233 receives electric power to attract hook member 231 to draw out the tip of hook member 231 from hole 234. This disengages lid member 90A from the locked position and furthermore elastic member 235 exerts a biasing force and lid member 90A accordingly assumes a half open position.

It should be noted that lid member 213A is provided with a terminal portion 226, and as lid member 213A opens, electromagnet 233 and power storage device 252 are electrically disconnected. With lid member 213A opened, connecting switch 237 does not conduct electric power to electromagnet 233, and lid member 90A is held in the closed position. Bringing lid member 213A from the open position to the closed position again electrically connect a line of electromagnet 233 and terminal portion 226.

Similarly, lid member 90A is provided with a terminal portion 236, and as lid member 90A opens, electromagnet 223 and power storage device 252 are electrically disconnected. With lid member 90A opened, connecting switch 237 does not conduct electric power to electromagnet 233, and lid member 90A is thus held in the closed position.

Note that hybrid vehicle 100 includes an alarm device 270 issuing an alarming sound, turning on an alarm lamp and/or the like when lid member 90A and lid member 213A are both in their respective open positions. Alarm device 270 includes an alarm 260 having an acoustic device issuing the alarming sound, the alarm lamp and/or the like, a power storage device 251 having electric power stored therein to be supplied to alarm 260, and a switching mechanism 265 operated to connect/disconnect power storage device 251 and alarm 260.

Switching mechanism 265 includes an electromagnet 240 connected to power storage device 252 and terminal portion 226, an electromagnet 250 connected to power storage device 252 and terminal portion 236, a connection piece 262 formed of metal and disconnected from a line 261 by a biasing force exerted by electromagnet 240, 250, and an elastic member 263 biasing connection piece 262 to connect connection piece 262 to line 261.

Note that electromagnet 240 is connected to power storage device 252 via terminal portion 226 of lid member 213A and electromagnet 241 is connected to power storage device 252 via terminal portion 236 of lid member 90A.

Thus, when lid member 213A is in the closed position, electromagnet 240 and power storage device 252 are held connected together, and furthermore, when lid member 90A is in the closed position, electromagnet 241 and power storage device 252 are held connected together. When at least one of electromagnet 240 and electromagnet 250 is connected to power storage device 252, at least one of electromagnet 240 and electromagnet 250 applies electromagnetic force to disconnect connection piece 262 from line 261.

More specifically, when at least one of lid member 90A and lid member 213A is in the closed position, alarm 260 does not receive electric power from power storage device 251. When lid member 90A and lid member 213A are both in their respective open positions, electromagnets 240, 250 do not apply electromagnetic force to connection piece 262, and connection piece 262 is connected to line 261 by a biasing force exerted by elastic member 263. Thus, when lid member 90A and lid member 213A are both set in their respective open positions, alarm 260 receives electric power, and an alarming sound is issued, an alarm lamp is turned on, and/or the like.

Lid member 90A and lid member 213A can thus be prevented from both assuming their open positions. This can prevent an operator from performing a charging/power feeding operation and a refueling operation simultaneously and thus reduce a mistake in the operations.

Second Embodiment

With reference to FIG. 7 to FIG. 13, the present invention in a second embodiment will be described. Note that in FIG. 7 to FIG. 13, any configuration identical or corresponding to that shown in FIG. 1 to FIG. 6 is identically denoted and will now be described.

Figure 7:
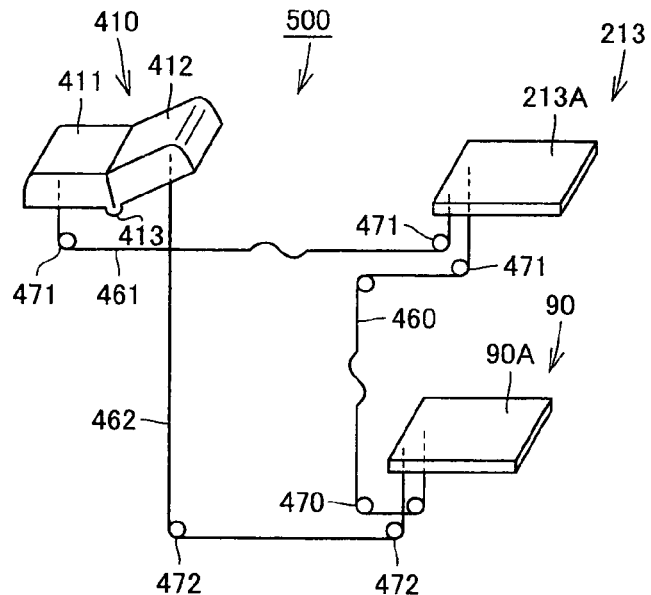
FIG. 7 is a schematic diagram generally showing a configuration of an open/close control mechanism mounted in a hybrid vehicle.

FIG. 7 is a schematic diagram generally showing a configuration of open/close control mechanism 500 mounted in hybrid vehicle 100. As shown in FIG. 7, open/close control mechanism 500 includes an opening 213A opening/closing the opening of refueling unit 213, lid member 90A of charging/power feeding unit 90, and a wire (a coupling member) 460 connected to lid member 213A and lid member 90A.

Wire 460 can thus interlock lid member 213A and lid member 90A, and when lid member 213A is set in the open position wire 460 sets lid member 90A to the closed position and when lid member 90A is opened wire 460 sets lid member 213A to the closed position. Wire 460 can thus prevent lid member 90A and lid member 213A from both assuming their respective open positions simultaneously.

Furthermore, wire 460 is adjusted in length to have a slack (or a margin for tension) when lid member 213A and lid member 90A are both in their respective closed positions. When one of lid member 213A and lid member 90A is opened, wire 460 is pulled and accordingly loses the slack and is thus tensioned. Accordingly, it is difficult to set the other of lid member 213A and lid member 90A in the open position. Lid member 213A and lid member 90A thus prevented from both assuming their open positions can prevent an operator from performing a refueling operation and a charging operation simultaneously and thus reduce a mistake made by the operator in the operations.

Note that in the second embodiment when lid member 213A is in the open position lid member 213A is open to such an extent that refueling connector 191 can be attached to refueling unit 213 and when lid member 90A is in the open position lid member 90A is open to such an extent that connector 190 can be attached to charging/power feeding unit 90.

Figure 8:
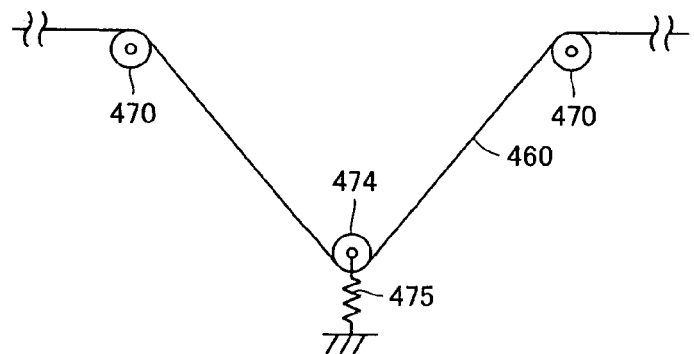
FIG. 8 is a schematic diagram of a tension mechanism.

Note that wire 460 is guided from lid member 213A to lid member 90A by a roller 470 provided to the vehicular body rotatably. Wire 460 may be provided with a tension mechanism such as shown in FIG. 8.

This tension mechanism includes an elastic member 475 such as a coil spring having one end secured to the vehicle, and a tension roller 474 provided at the other end of elastic member 475 and displaceable in accordance with how wire 460 is tensioned.

The tension mechanism has elastic member 475 contracted to prevent wire 460 from having a slack when lid member 213A and lid member 90A are both closed, and for example when any one of lid member 213A and lid member 90A is opened and wire 460 is pulled, elastic member 475 is stretched. Wire 460 can thus be held tensioned to prevent wire 460 from coming off roller 470 or the like.

When lid member 213A and lid member 90A are both in their respective closed positions, a margin for tension of wire 460 of an extent can be ensured to allow one of lid member 213A and lid member 90A to assume the open position.

In FIG. 7, open/close control mechanism 500 includes a switching mechanism 420 switchable for example between a first position that allows lid member 213A to be operable to be opened/closed and sets lid member 90A in the closed position, and a second position that allows lid member 90A to be operable to be opened/closed and sets lid member 213A in the closed position. Switching mechanism 420 includes an operation unit 410 operated by a driver and including a switching piece 411 and a switching piece 412, and a wire 462 coupling switching piece 412 and lid member 90A, a wire 461 coupling lid member 213A and switching piece 411. Switching mechanism 420 is operated by the driver to allow one of lid member 213A and lid member 90A to be selectively opened.

Note that operation unit 410 is provided pivotably around an axial portion 413. It is disposed for example in a cabin, such as at a dashboard closer to the driver's seat. Operation unit 410 is bent and includes switching piece 411 and switching piece 412 contiguous to be bent relative to switching piece 411.

When switching piece 411 displaces to be along the surface of the dashboard, switching piece 412 displaces to lift off the surface of the dashboard. When switching piece 412 displaces to be along the surface of the dashboard, switching piece 411 displaces to lift off the surface of the dashboard.

When lid member 213A is closed, and in that condition the driver or the like sets ON switching piece 411 to switch switching piece 411 to be along the surface of the dashboard, the distance between that end of wire 461 connected to lid member 213A and that of wire 461 connected to switching piece 411 is decreased and wire 461 thus has a slack (a margin for tension). This allows lid member 213A to be opened.

On the other hand, switching piece 412 displacing as described above increases a distance between that end of wire 462 connected to switching piece 412 and that of wire 462 connected to lid member 90A. This tensions wire 462 and can prevent lid member 90A from being opened. Switching piece 411 set ON and switching piece 412 set OFF can thus prevent lid member 90A from being opened and permit lid member 213A to be opened.

Figure 9:
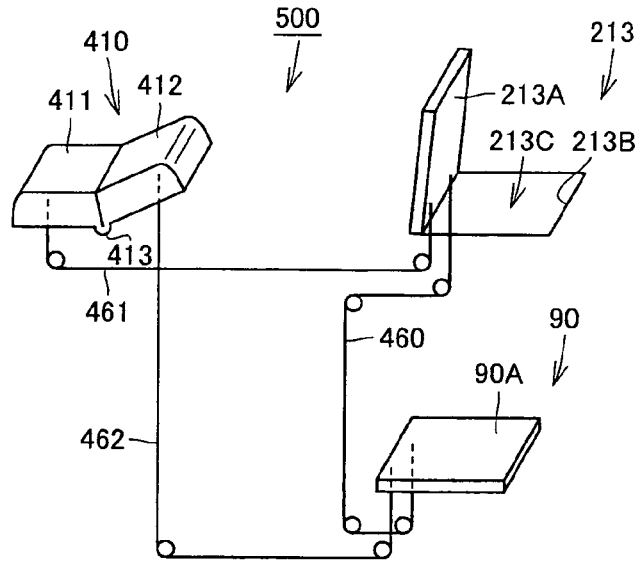
FIG. 9 is a schematic diagram of the open/close control mechanism with a switching piece set on and a switching piece set off to open a lid member.

FIG. 9 is a schematic diagram of open/close control mechanism 500 with switching piece 411 set ON and switching piece 412 set OFF to open lid member 213A.

As shown in FIG. 9, opening lid member 213A with switching piece 411 set ON allows refueling connector 191 to be connected to nozzle receiving unit 215. On the other hand, as lid member 213A is opened, wire 460 is tensioned, and wire 462 is also tensioned to prevent lid member 90A from being opened.

FIG. 10 is a schematic diagram of open/close control mechanism 500 with switching piece 411 set OFF and switching piece 412 set ON to close both lid member 213A and lid member 90A. As shown in FIG. 10, switching piece 412 is switched to be along the surface of the dashboard and switching piece 411 is positioned to be lifted off the surface of the dashboard.

Operation unit 410 thus switched decreases a distance between that end of wire 462 connected to switching piece 412 and that of wire 462 connected to lid member 90A. This provides wire 462 with a slack and permits lid member 90A to be opened. On the other hand, the distance between that end of wire 461 connected to switching piece 411 and that of wire 461 connected to lid member 213A, is increased. This tensions wire 461 and prevents lid member 213A from being opened. FIG. 11 is a schematic diagram of open/close control mechanism 500 with switching piece 411 set OFF and switching piece 412 set ON to open lid member 90A.

As shown in FIG. 11, when lid member 90A is opened, wire 460 is tensioned. This can prevent lid member 213A from being opened. The second embodiment can thus provide open/close control mechanism 500 preventing lid member 213A and lid member 90A from being opened simultaneously.

Figure 12:
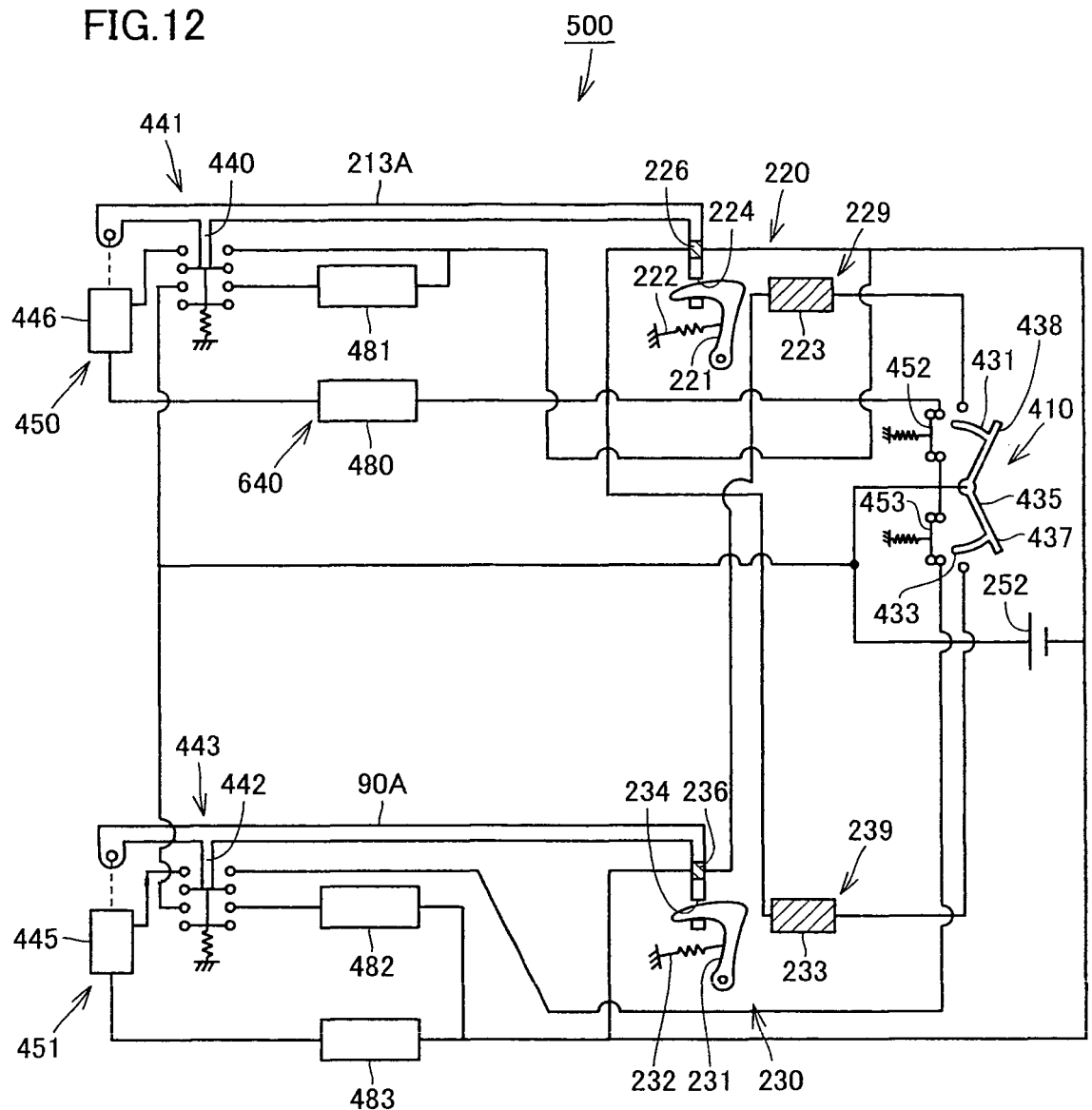
FIG. 12 shows the open/close control mechanism of the present invention in a second embodiment in an exemplary variation.

FIG. 12 shows open/close control mechanism 500 of the present invention in the second embodiment in an exemplary variation. As shown in FIG. 12, open/close control mechanism 500 includes operation unit 410 selecting a lid member that should be set in the open position, lock mechanism 220 locking lid member 213A in the closed position, disengagement mechanism 229 capable of canceling a locked position held by lock mechanism 220, lock mechanism 230 holding lid member 90A in the closed position, disengagement mechanism 239 capable of canceling a locked position held by lock mechanism 230, and power storage device 252.

Open/close control mechanism 500 includes a closing mechanism 450 rotatably driving lid member 213A in the open position to set lid member 213A in the closed position, and a closing mechanism 451 rotatably driving lid member 90A in the open position to set lid member 90A in the closed position.

Lock mechanism 220 includes hook member 221 having a tip inserted in hole 224 formed in lid member 213A, and biasing member 222 biasing hook member 221. Biasing member 222 biases hook member 221 to allow hook member 221 to have the tip inserted in hole 224. Note that lid member 213A has one side portion axially supported. Hole 224 is provided in lid member 213A at a side portion opposite to one side portion.

Lock mechanism 230 includes hook member 231 having a tip inserted in hole 234 formed in lid member 90A, and biasing member 232 biasing hook member 231. Biasing member 232 biases hook member 231 to allow hook member 231 to have the tip inserted in hole 234.

Disengagement mechanism 229 includes electromagnet 223 and terminal portion 236 provided to lid member 90A. It should be noted that terminal portion 236 is provided in a circuit electrically connecting electromagnet 223 and power storage device 252 and once lid member 90A has assumed the open position terminal portion 236 can disconnect electromagnet 223 and power storage device 252. Furthermore, similarly, disengagement mechanism 239 includes electromagnet 233 and terminal portion 226 capable of electrically disconnecting electromagnet 233 and power storage device 252 as lid member 213A assumes the open position.

Open/close control mechanism 500 includes an alarm device 640. Alarm device 640 includes an alarm unit 481 drivable while lid member 213A is open, and an alarm unit 482 drivable while lid member 90A is open. Furthermore, alarm device 640 includes an alarm unit 480 and an alarm unit 483.

Alarm unit 481 is connected via a switch 441 to power storage device 252. Switch 441 includes a connection piece connecting a line connected to alarm unit 481 and a line connected to power storage device 252, and a biasing member biasing the connection piece to connect the lines.

Lid member 213A has a projection 440. When lid member 213A is in the closed position, projection 440 can press the connection piece to electrically disconnect alarm unit 481 and power storage device 252. Thus when lid member 213A is in the closed position alarm unit 481 is not driven.

In contrast, once lid member 213A has attained the open position, the biasing member exerts a biasing force and the connection piece thus electrically connects the line connected to power storage device 252 and the line connected to alarm unit 481. Thus when lid member 213A is in the open position alarm unit 481 is driven.

Alarm unit 482 is connected via a switch 443 to power storage device 252. Switch 443 includes a connection piece connecting a line connected to alarm unit 482 and a line connected to power storage device 252, and a biasing member biasing the connection piece to connect the lines.

Lid member 90A has a projection 442. When lid member 90A is in the closed position, projection 442 can press the connection piece to electrically disconnect alarm unit 482 and power storage device 252. Thus when lid member 90A is in the closed position alarm unit 482 is not driven.

In contrast, once lid member 90A has attained the open position, the biasing member exerts a biasing force and the connection piece thus electrically connects the line connected to power storage device 252 and the line connected to alarm unit 482. Thus when lid member 90A is in the open position alarm unit 482 is driven.

Thus in the FIG. 12 example when at least one of lid member 213A and lid member 90A is in the open position an alarm operation is performed to attract the driver's or operator's attention to inform him/her that a lid member is open.

Figure 13:
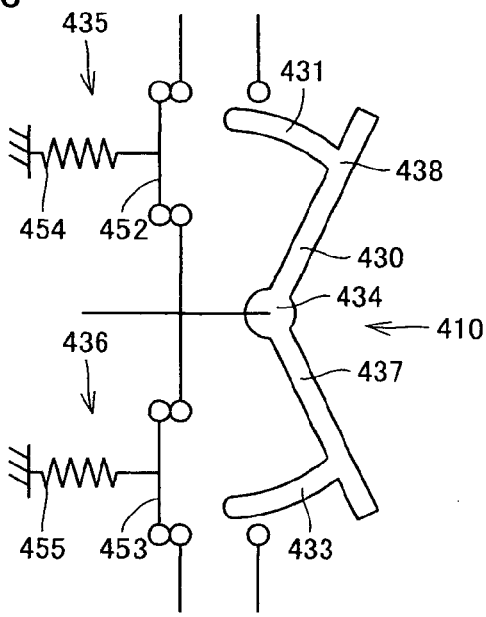
FIG. 13 is a schematic diagram generally showing an operation unit in configuration.

FIG. 13 is a schematic diagram generally showing a configuration of operation unit 410. As shown in FIG. 13, operation unit 410 includes a switch 430 having a switching piece 438, a switching piece 437 arranged to bend relative to switching piece 438, and an axial portion 434 provided at a portion coupling switching piece 437 and switching piece 438 together. Switch 430 is provided at the driver's seat, a dashboard in the vicinity thereof, or the like rotatably around axial portion 434.

When switching piece 438 is selected and set ON, electromagnet 223 is driven to draw out hook member 221 from hole 224. This disengages lid member 213A from the locked position to allow lid member 213A to be opened. When lid member 213A is opened, terminal portion 226 disconnects electromagnet 233 and power storage device 252 and lid member 90A can be held in the closed position.

When switching piece 437 is selected and set ON, electromagnet 233 is driven to draw out hook member 231 from hole 234. This disengages lid member 90A from the locked position to allow lid member 90A to be opened. When lid member 90A is opened, electromagnet 223 and power storage device 252 are electrically disconnected and driving electromagnet 223 can be prevented. Lid member 213A can thus be held in the closed position.

In FIG. 12 closing mechanism 450 includes a motor 446 rotating lid member 213A in the open position to close lid member 213A, and closing mechanism 451 includes a motor 445 rotating lid member 90A in the open position to close lid member 90A.

Motor 446 is connected to power storage device 252 via a switch 435 switched ON/OFF by operation unit 410 and switch 441 switched ON/OFF by whether lid member 213A assumes the open or closed position.

Motor 445 is connected to power storage device 252 via a switch 436 switched ON/OFF by operation unit 410 and switch 443 switched ON/OFF by whether lid member 90A assumes the open or closed position.

Note that, as shown in FIG. 12 and FIG. 13, alarm unit 480 and motor 446 are connected to power storage device 252 in series, and motor 445 and alarm unit 483 are connected to power storage device 252 via switch 435 shown in FIG. 13 in series. Switch 435 includes a connection piece 452 capable of connecting a line connected to alarm unit 480 and motor 446 and a line connected to power storage device 252, and a biasing member 454 biasing connection piece 452 to connect the lines.

In FIG. 13, switch 430 has switching piece 438 with a projection 431 capable of pressing connection piece 452. When switch 430 has switching piece 438 switched ON connection piece 452 is pressed by projection 431 to move away from the lines. Thus when switching piece 438 that is selected to unlock lid member 213A is selected and thus switched ON alarm unit 480 and motor 446 are not driven.

Switch 436 includes a connection piece 453 capable of connecting a line connected to alarm unit 483 and motor 445 and a line connected to power storage device 252, and a biasing member 455 biasing connection piece 453 to connect the lines. Note that connection piece 453 can be pressed by a projection 433 of switching piece 437.

When switching piece 438 is selected, switching piece 437 has projection 433 moved away from connection piece 453 to allow connection piece 453 to connect the lines together. Switch 443 includes a connection piece capable of connecting a line connected to motor 445 and alarm unit 483 and a line connected to power storage device 252, and a biasing member biasing the connection piece to connect the lines together. This connection piece is adapted such that when it is pressed by projection 442 of lid member 90A it can move away from the lines and when it is no longer pressed by projection 442 it can connect the lines together.

Thus, when switch 430 has switching piece 438 selected and in that condition lid member 90A is in the open position, switch 443 and switch 436 are turned ON and alarm unit 483 and motor 445 receive electric power from power storage device 252.

Thus alarm unit 483 performs an alarm operation. Furthermore, motor 445 drives lid member 90A to assume the closed position. Once lid member 90A has been set in the closed position, switch 443 is turned OFF and driving alarm unit 483 and alarm unit 482 is stopped. Note that on that occasion, electromagnet 223 is not supplied with electric power, and when lid member 90A is set in the closed position, lock mechanism 230 locks lid member 90A.

Note that when lid member 90A is in the open position, and switch 430 has switching piece 438 selected, disengagement mechanism 229 is not driven, and lid member 213A can be held in the locked position. Lid member 213A can thus be prevented from being opened when lid member 90A is in the open position.

When switching piece 437 is selected, switching piece 438 has projection 431 moved away from connection piece 452 and connection piece 452 electrically connects the lines together. Switch 441 includes a connection piece capable of connecting a line connected to motor 446 and alarm unit 480 and a line connected to power storage device 252, and a biasing member biasing the connection piece to connect the lines.

Thus when switching piece 437 is selected and in that condition lid member 213A is in the open position, switch 441 and switch 435 are both turned ON and alarm unit 480 and motor 446 are driven. Thus, lid member 213A is pivoted by motor 446 to be closed and once lid member 213A has been set in the closed position it is locked by lock mechanism 220. Note that when lid member 213A is in the open position, electromagnet 223 is not supplied with electric power and setting lid member 90A in the open position is prevented.

Furthermore, when switch 430 does not have any of switching piece 438 and switching piece 437 selected, projection 433 and projection 431 are both spaced from connection piece 453 and connection piece 452 and switch 435 and switch 436 are both turned ON.

Thus when switch 430 does not have any of switching piece 438 and switching piece 437 selected, and in that condition lid member 213A is in the open position, switch 441 is turned ON, and alarm unit 480 and motor 446 are driven, and as motor 446 is driven, lid member 213A is set in the closed position.

Furthermore, switch 430 does not have any of switching piece 438 and switching piece 437 selected, and in that condition lid member 90A is in the open position, switch 443 is turned ON, and alarm unit 483 and motor 445 are driven, and as motor 445 is driven, lid member 90A is set in the closed position.

Thus the FIG. 12 example can also prevent lid member 213A and lid member 90A from both assuming their respective open positions.

Third Embodiment

With reference to FIG. 14 to FIG. 23, the present invention in a third embodiment provides open/close control mechanism 500 mounted in a vehicle, as will be described hereinafter. Note that in FIG. 14 to FIG. 23, any configuration identical or corresponding to that shown in FIG. 1 to FIG. 13 is identically denoted and may not be described.

Figure 14:
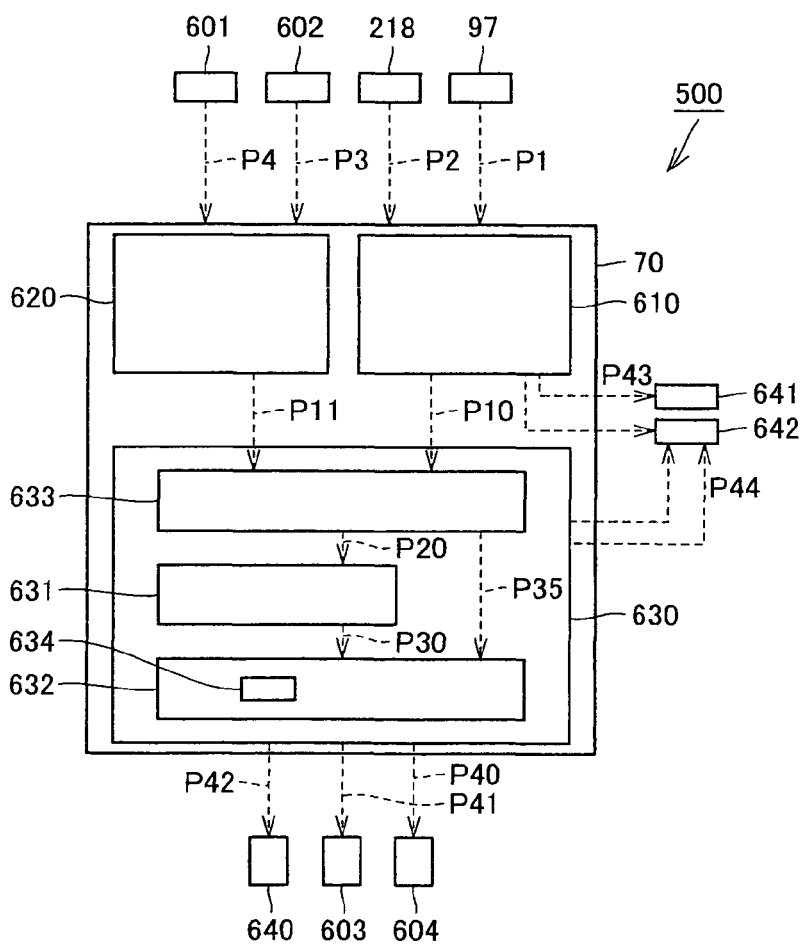
FIG. 14 is a block diagram of an open/close control mechanism mounted in a vehicle in accordance with the present invention in a third embodiment.

FIG. 14 is a block diagram of open/close control mechanism 500 mounted in a vehicle in accordance with the present invention in an embodiment. As shown in FIG. 14, open/close control mechanism 500 includes a detection unit including a sensor 97 sensing whether lid member 90A is in the open or closed position and a sensor 218 capable of sensing whether lid member 213A is in the open or closed position, and an output unit including an alarm display 642 alarming that lid member 90A is in the open position and an alarm display 641 alarming that lid member 213A is in the open position.

Open/close control mechanism 500 includes control device 70 including a unit 610 for determining whether the lids are open/closed. Unit 610 for determining whether the lids are open/closed is operative in response to switching signals P1, P2 received from sensor 97 and sensor 218 to drive alarm display 641 and alarm display 642.

Open/close control mechanism 500 includes as a detection unit an insertion sensor 601 sensing whether refueling connector 191 is inserted in nozzle receiving unit 215 of refueling unit 213 and an insertion sensor 602 sensing whether connector 190 is attached to insertion unit 91 of charging/power feeding unit 90.

Furthermore, open/close control mechanism 500 includes as an output unit a motor 603 for switching lid member 213A from the open position to the closed position, and a motor 604 for switching lid member 213A from the open position to the closed position.

Control device 70 includes a unit 620 for determining whether a plug has been inserted. Unit 620 for determining whether a plug has been inserted is operative in response to an insertion signal P3 received from insertion sensor 602 and an insertion signal P4 received from insertion sensor 601 to determine whether charging/power feeding unit 90 has connector 190 connected thereto or disconnected therefrom and whether refueling unit 213 has refueling connector 191 connected thereto or disconnected therefrom.

Control device 70 includes a drive control unit 630 operative in response to open/close information P10 received from unit 610 for determining whether the lids are open/closed and insertion information P11 received from unit 620 for determining whether a plug has been inserted, to drive alarm displays 641, 642, insertion sensors 602, 602, alarm device 640 and the like.

Note that drive control unit 630 includes a unit 633 for determining an initial state. Unit 633 for determining an initial state is operative to determine from open/close information P10 and insertion information P11 whether lid member 90A and lid member 213A are currently in their open or closed positions and whether connector 190 and refueling connector 191 are currently attached or detached.

For example when at least one of lid member 90A and lid member 213A is in the open position and the other is in the closed position, and neither connector 190 nor refueling connector 191 are attached, then it is necessary to determine whether a refueling operation/a charging/power feeding operation is currently underway or to close the lid is simply forgotten.

If the lid member is held in the open position for a predetermined period of time and refueling connector 191 and connector 190 are also continuously disconnected, then it can be determined that to close the lid is simply forgotten.

Accordingly, drive control unit 630 includes a unit 631 for determining whether a state continues for a predetermined period of time. Unit 631 for determining whether a state continues for a predetermined period of time determines whether in an initial state one lid member is in the open position continuously for the predetermined period of time and that lid member in the open position has a connector detached therefrom continuously for the predetermined period of time.

If lid member 90A and lid member 213A are both in their respective open positions and both do not have connector 190 and refueling connector 191 attached thereto, then it is necessary to set both lid member 90A and lid member 213A in their respective closed positions to prevent performing a refueling operation and a charging/power feeding operation simultaneously.

Furthermore, when lid member 90A and lid member 213A are both in their respective open positions, and refueling connector 191 is inserted, there is also a large possibility that a refueling operation and a charging/power feeding operation may simultaneously be performed, and accordingly, lid member 90A needs to be closed.

Furthermore, when lid member 90A and lid member 213A are both in their respective open positions, and connector 190 is attached, there is also a large possibility that a refueling operation and a charging/power feeding operation may simultaneously be performed, and accordingly, lid member 213A needs to be closed.

In these cases, it is necessary to drive motors 603, 604 and alarm device 640 in accordance with each state.

Accordingly, drive control unit 630 includes a final processing unit 632 for driving motors 603, 604 and alarm device 640, and furthermore, alarm display 641 and alarm display 642 in accordance with each state, as appropriate.

In this case, drive information P35 is transmitted from unit 633 for determining an initial state to final processing unit 632, and in accordance with drive information P35 final processing unit 632 drives each output unit.

Furthermore, if unit 631 for determining whether a state continues for a predetermined period of time determines that a lid member is continuously forgotten to be closed, unit 631 for determining whether a state continues for a predetermined period of time also transmits drive information P30 to final processing unit 632, and final processing unit 632 drives each output unit in accordance with drive information P30.

Furthermore, final processing unit 632 includes a unit 634 for determining a closed position. When lid member 90A or lid member 213A in the open position that is selected is to be set in the closed position, unit 634 for determining a closed position determines whether lid member 90A or lid member 213A that is selected is set in the closed position within the predetermined period of time.

In other words, if lid member 90A or lid member 213A that starts a closing operation does not complete the closed position within the predetermined period of time, there may be a foreign matter between that lid member and a vehicular casing. In that case, unit 634 for determining a closed position performs an alarm operation informing the surroundings that an abnormal event has arisen.

Figure 15:
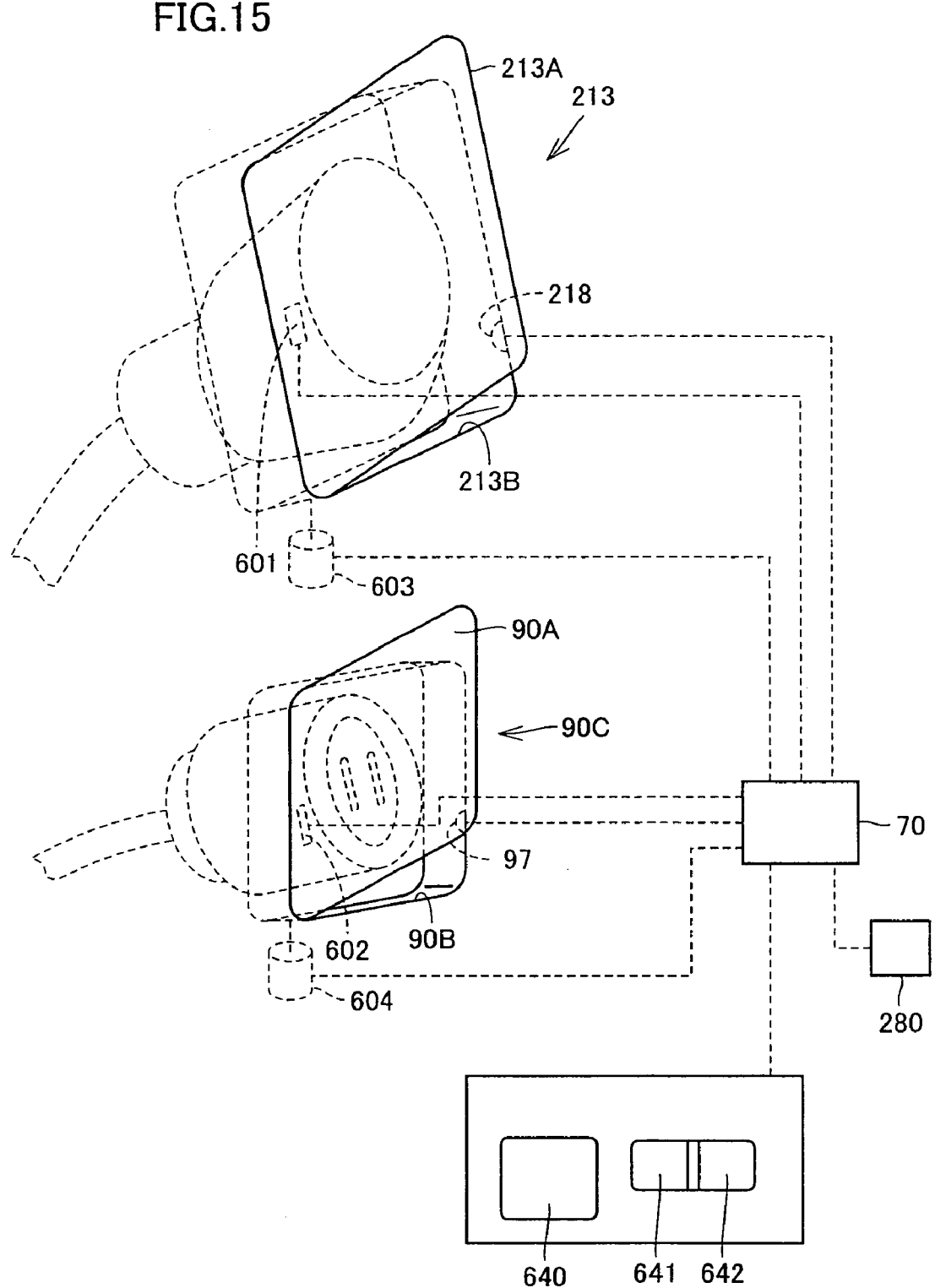
FIG. 15 is a schematic diagram schematically showing each member configuring the open/close control mechanism.

Note that FIG. 15 is a schematic diagram schematically showing each member configuring open/close control mechanism 500. As shown in FIG. 15, alarm device 640, alarm display 641 and alarm display 642 are disposed at the dashboard and in a vicinity thereof to enable the driver to readily observe them.

Reference will now be made to FIG. 16 to FIG. 23 to specifically describe each process.

Figure 16:
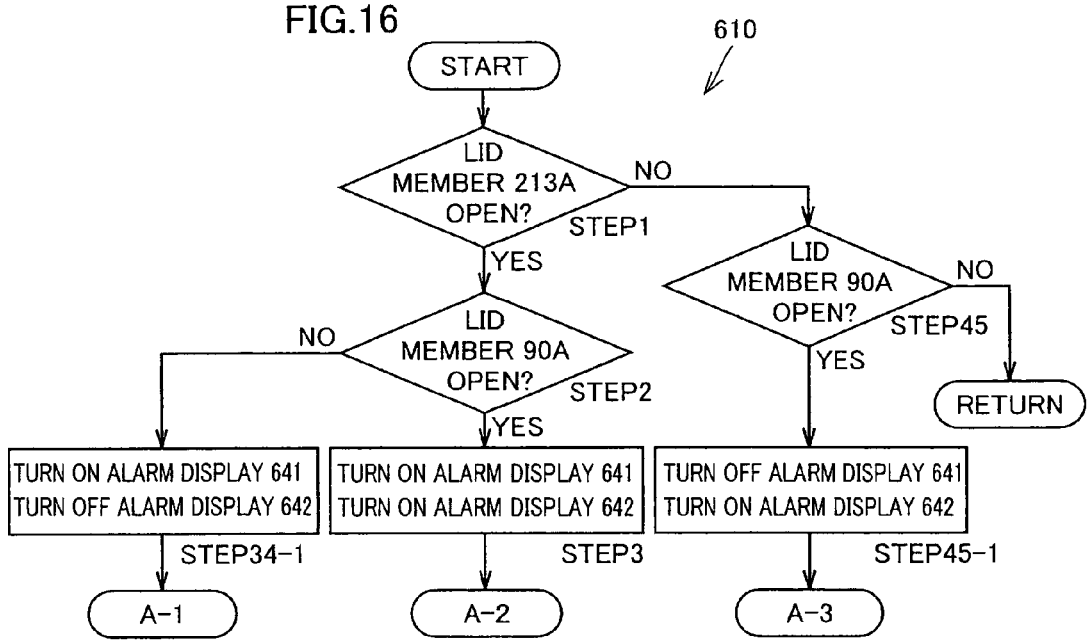
FIG. 16 is a flowchart of a process in a unit for determining whether a lid is open/closed.

FIG. 16 is a flowchart of a process in unit 610 for determining whether the lids are open/closed. As shown in FIG. 16, initially, unit 610 for determining whether the lids are open/closed determines whether lid member 213A is in the open position (STEP 1). If so, then unit 610 determines whether lid member 90A is in the open position (STEP 2). If so, alarm display 641 and alarm display 642 are set ON (STEP 3).

If lid member 213A and lid member 90A are both in their respective open positions, a decision is made on whether connector 190 and refueling connector 191 are attached (A-2).

Figure 17:
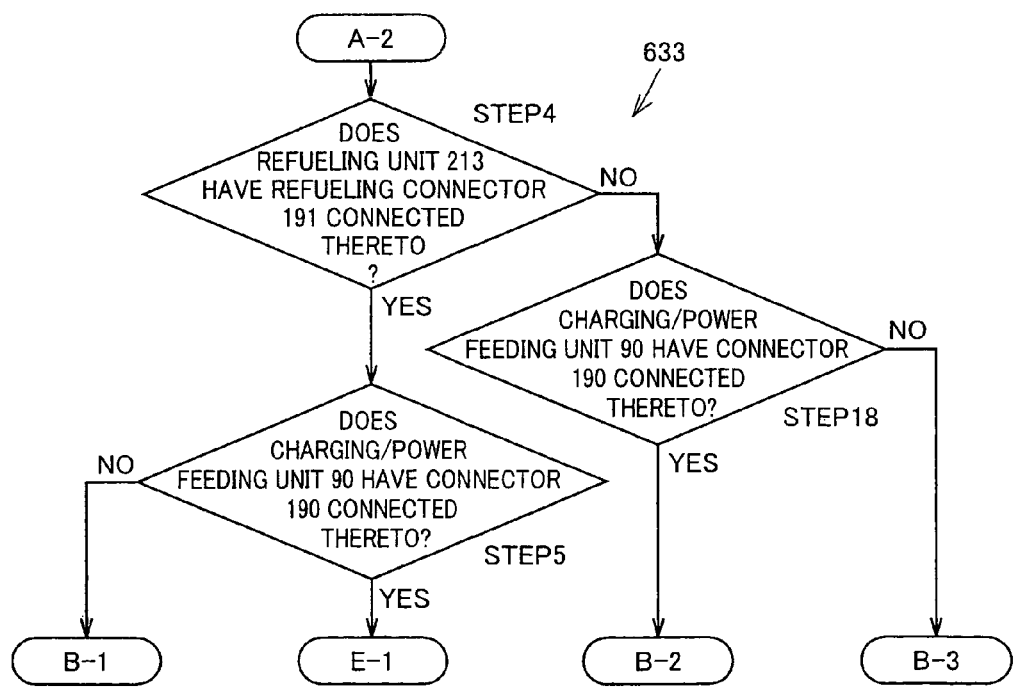
FIG. 17 is a flowchart of determining in a unit for determining an initial state whether a connector and a refueling connector are attached when lid members are both open.

FIG. 17 is a flowchart of how unit 633 for determining an initial state determines whether connector 190 and refueling connector 191 are attached when lid member 90A and lid member 213A are both in their respective open positions.

As shown in FIG. 17, initially, a decision is made on whether refueling unit 213 has refueling connector 191 connected thereto (STEP 4). If so, a decision is made on whether charging/power feeding unit 90 has connector 190 connected thereto (STEP 5).

If a decision is made that charging/power feeding unit 90 does not have connector 190 connected thereto, lid member 213A and lid member 90A are both in their respective open positions and only refueling unit 213 has refueling connector 191 attached thereto. In that case, a process (B-1) is performed to set the lid member that does not have connector 190 connected thereto, i.e., lid member 90A of charging/power feeding unit 90, in the closed position.

Then, unit 633 for determining an initial state transmits drive information P35 to final processing unit 632.

Figure 18:
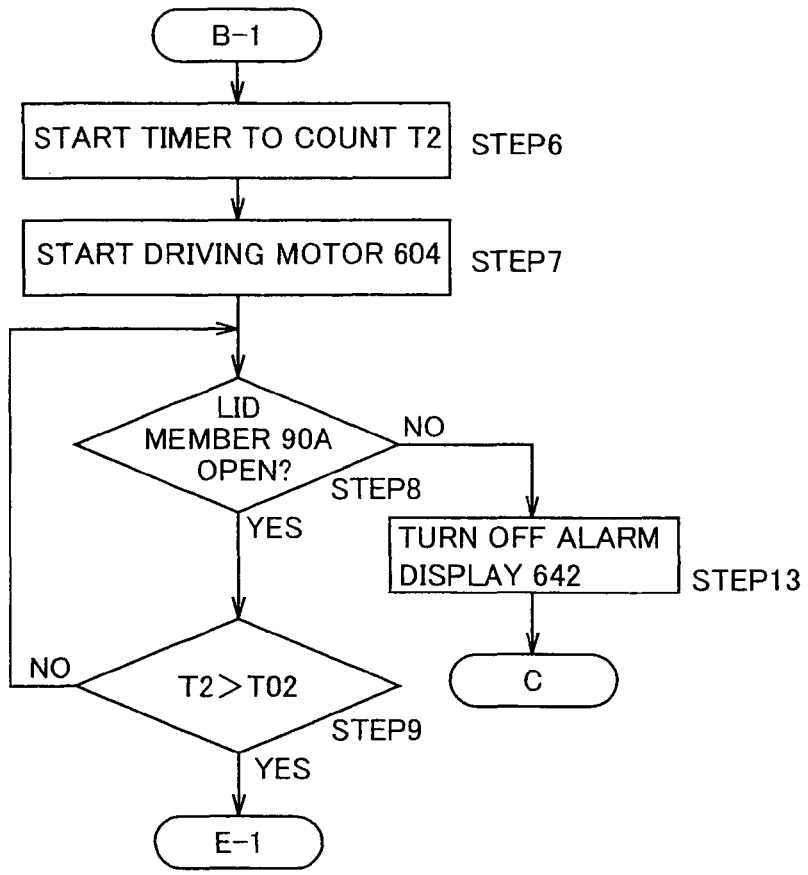
FIG. 18 is a flowchart for a final processing unit to close a lid member.

FIG. 18 is a flowchart of how final processing unit 632 sets lid member 90A in the closed position. As shown in FIG. 18, final processing unit 632 initially starts timer 280 to count (STEP 6).

Motor 604 is driven to drive motor 604 to set lid member 90A in the closed position (STEP 7).

Then a decision is made on whether lid member 90A is set in the closed position before a predetermined period of time elapses, and if not, alarm device 640 is driven. More specifically, initially, a decision is made on whether lid member 90A is in the open position (STEP 8).

If a decision is made that lid member 90A is in the open position, then a decision is made on whether a count T2 counted by timer 280 is larger than a preset, predetermined time T02 (STEP 9).

If not, the control returns STEP 8 and determines whether lid member 90A is in the open position (STEP 8).

If so then again a decision is made on whether count T2 counted by timer 280 is larger than predetermined time T02 (STEP 9).

If in STEP 9 a decision is made that count T2 is larger than predetermined time T02, there may be caused a detrimental event, such as a foreign matter between lid member 90A and the vehicular body. Accordingly, a process (E-1) is performed to set an alarming mode for drawing the attention of the driver, the operator or the like to inform him/her that an abnormal event has arisen. Note that in that case, process E-1 may be preceded by a step additionally introduced to display that an abnormal event has arisen to lid member 90A, although not shown in the FIG. 18 flowchart.

Figure 19:
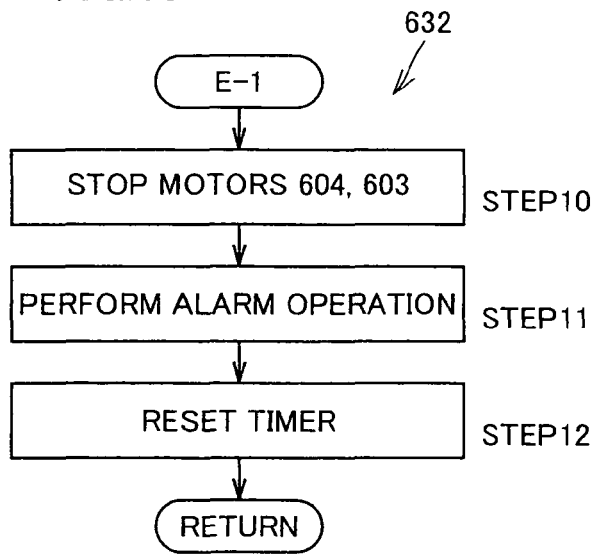
FIG. 19 is a flowchart of a process performed when the final processing unit performs an alarming process.

FIG. 19 is a flowchart of a process performed when final processing unit 632 performs an alarming process. As shown in FIG. 19, when final processing unit 632 performs the alarming process, driving motor 604 and motor 603 is initially stopped (STEP 10).

Then, alarm device 640 is driven to draw an attention of the surroundings (STEP 11). Thereafter, timer 280 is reset (STEP 12), and the control returns to STEP 1 (RETURN).

If in FIG. 18 at STEP 8 a decision is made that lid member 90A is in the closed position, rather than the open position, then alarm display 642 is set OFF (STEP 13).

Thus, when lid member 90A is set in the closed position, only a refueling operation supplying gasoline or the like from refueling unit 213 is performed. Thus once a normal state has been attained, a process (C) is performed to set a normal driving operation mode.

Figure 20:
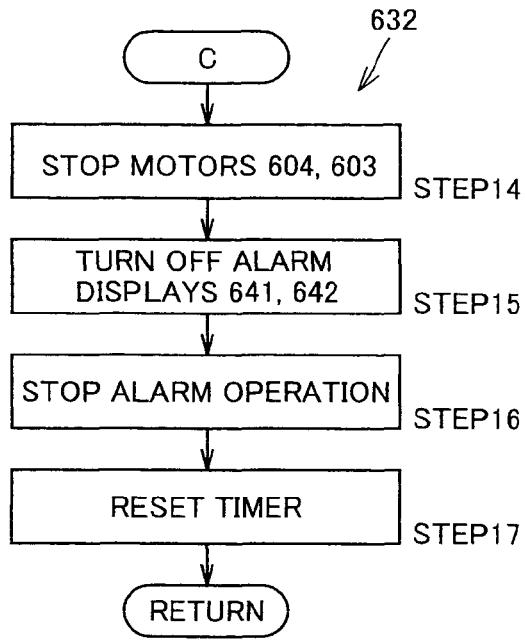
FIG. 20 is a flowchart of a process performed when the final processing unit switches to a normal mode.

FIG. 20 is a flowchart of a process performed when final processing unit 632 switches to the normal mode. As shown in FIG. 20, final processing unit 632 initially stops driving motor 603 and motor 604 (STEP 14).

Then, alarm display 641 and alarm display 642 are set OFF (STEP 15). Then, driving alarm device 640 is stopped (STEP 16). Then, timer 280 is reset (STEP 17). Then, the control returns to STEP 1.

With reference to FIG. 17, if a decision is made in STEP 5 that charging/power feeding unit 90 has connector 190 connected thereto, then lid member 213A and lid member 90A are both in their respective open positions, and refueling unit 213 has refueling connector 191 connected thereto and charging/power feeding unit 90 has connector 190 connected thereto.

In that case it is inferred that a refueling operation and a charging/power feeding operation are performed simultaneously. Furthermore, as connector 190 and refueling connector 191 are both connected, neither lid member 90A nor lid member 213A can be closed.

Accordingly, unit 633 for determining an initial state transmits drive information P35 to final processing unit 632 and final processing unit 632 performs the alarming process (E-1) as described above.

In FIG. 17 if a decision is made in STEP 4 that refueling unit 213 does not have refueling connector 191 connected thereto, then unit 633 for determining an initial state determines whether charging/power feeding unit 90 has connector 190 connected thereto (STEP 18).

If so, lid member 90A and lid member 213A are both in their respective open positions and only charging/power feeding unit 90 has connector 190 connected thereto.

This case also has a possibility that a charging/power feeding operation and a refueling operation may simultaneously be performed, and accordingly, a process (B-2) is performed to set lid member 213A in the closed position.

Accordingly, unit 633 for determining an initial state transmits drive information P35 to final processing unit 632.

Figure 21:
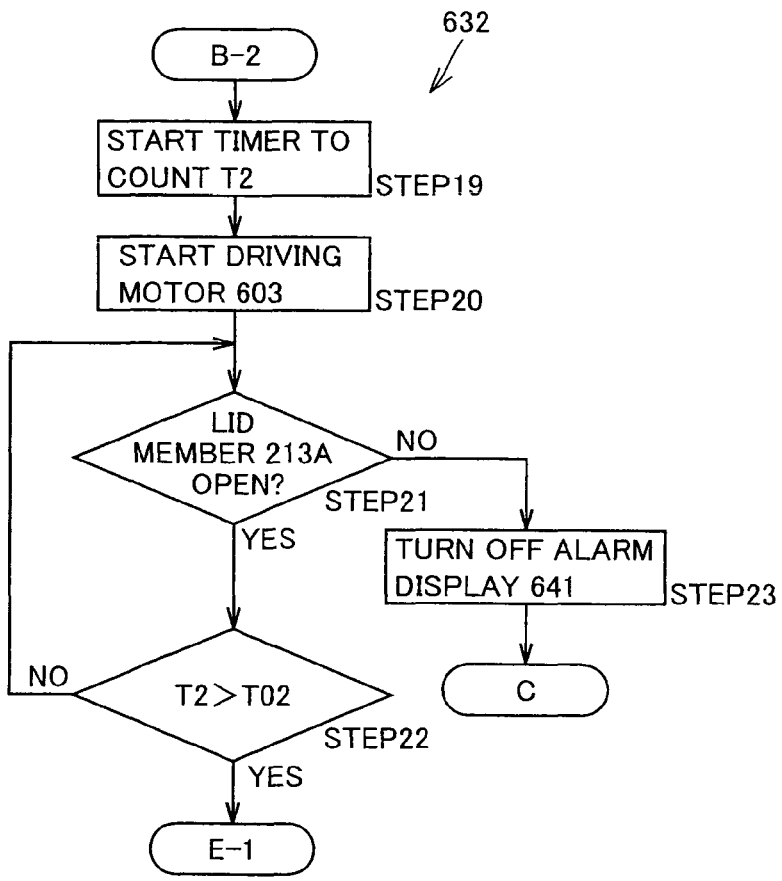
FIG. 21 is a flowchart for the final processing unit to close a lid member.

FIG. 21 is a flowchart of a process for final processing unit 632 to set lid member 213A in the closed position. As shown in FIG. 21, final processing unit 632 initially starts timer 280 to count (STEP 19).

Motor 603 is driven to drive motor 603 to set lid member 213A in the closed position (STEP 20).

Then a decision is made on whether lid member 213A is set in the closed position before a predetermined period of time elapses, and if not, alarm device 640 is driven. More specifically, initially, a decision is made on whether lid member 213A is in the open position (STEP 21).

If a decision is made that lid member 213A is in the open position, then a decision is made on whether count T2 counted by timer 280 is larger than preset, predetermined time T02 (STEP 22).

If not, the control returns STEP 21 and determines whether lid member 213A is in the open position (STEP 21).

If so then again a decision is made on whether count T2 counted by timer 280 is larger than predetermined time T02 (STEP 22).

If in STEP 22 a decision is made that count T2 is larger than predetermined time T02, there may be caused a detrimental event, such as a foreign matter between lid member 213A and the vehicular body. Accordingly, a process is performed to set an alarming mode for drawing the attention of the driver, the operator or the like to inform him/her that an abnormal event has arisen (E-1).

Then in STEP 21 if a decision is made that lid member 213A is in the closed position then alarm display 641 is set OFF (STEP 23). In this case a decision can be made that a charging/power feeding operation is alone performed at charging/power feeding unit 90 and hence normally. Accordingly, final processing unit 632 performs a normal process (C).

Herein in FIG. 17 at STEP 18 if a decision is made that charging/power feeding unit 90 does not have connector 190 connected thereto, then lid member 213A and lid member 90A are in their respective open positions and connector 190 and refueling connector 191 are both not connected.

In such condition, a charging/power feeding operation and a refueling operation may simultaneously be performed, and unit 633 for determining an initial state transmits drive information P35 to final processing unit 632 to perform a process to close both lid member 90A and lid member 213A.

Then, final processing unit 632 performs a process to close both lid member 90A and lid member 213A (B-3).

Figure 23:
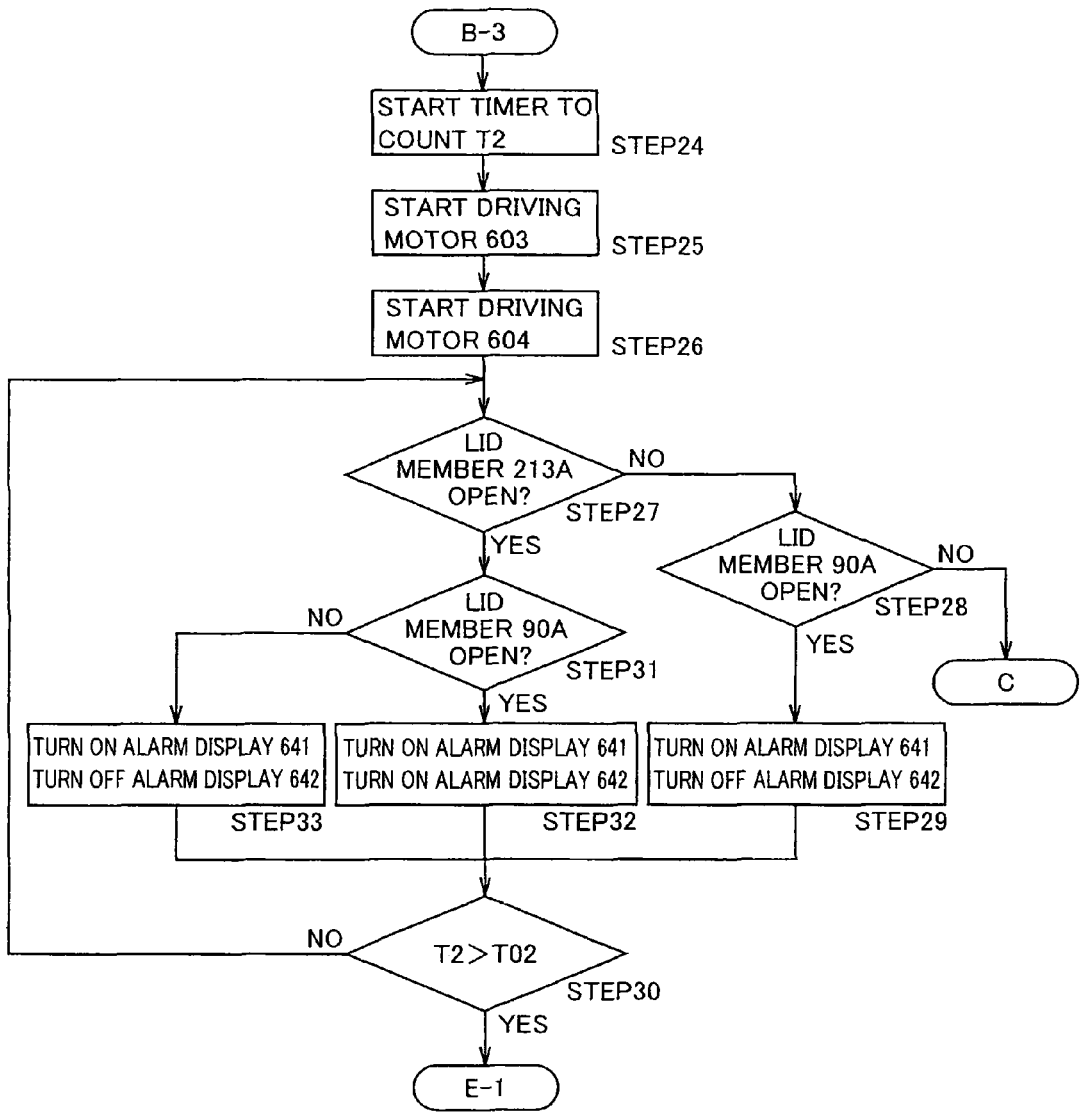
FIG. 23 is a flowchart of a process performed when the final processing unit closes both a lid member and a lid member.

FIG. 23 is a flowchart of a process performed when final processing unit 632 sets both lid member 90A and lid member 213A in their respective closed positions.

As shown in FIG. 23, initially, unit 633 for determining an initial state starts timer 280 to count (STEP 24). Motor 603 and motor 604 are driven (STEPS 25, 26). When motor 603 and motor 604 are driven to set lid member 90A and lid member 213A in their respective closed positions, a decision is made on whether a detrimental event has arisen such as a foreign matter or the like between lid member 90A and the body, between lid member 213A and the body, and/or the like.

More specifically, a decision is made on whether lid member 90A and lid member 213A are set in their respective closed positions within a predetermined period of time after driving motor 603 and motor 604 is started. If lid member 90A and lid member 213A are both set in their respective closed positions, normal process (C) is performed. If at least one of lid member 90A and lid member 213A is in the open position, alarming process (E-1) is performed.

More specifically, final processing unit 632 initially determines whether lid member 213A is in the open position (STEP 27). If a decision is made that lid member 213A is in the closed position then a decision is made on whether lid member 90A is open (STEP 28). If a decision is made that lid member 90A is in the closed position, lid member 90A and lid member 213A are both in their respective closed positions, and a process is performed to perform the normal process (C).

If in STEP 28 a decision is made that lid member 90A is in the open position, then final processing unit 632 sets alarm display 641 OFF and sets alarm display 642 ON (STEP 29).

Then, final processing unit 632 determines whether counter T2 is larger than predetermined time T02 (STEP 30). If final processing unit 632 determines that counter T2 is equal to or smaller than predetermined time T02, the control returns to STEP 27. If a decision is made that count T2 has passed predetermined time T02, then it is inferred that lid member 90A cannot be closed within a predetermined period of time and there may be a foreign matter between lid member 90A and the body. Accordingly, final processing unit 632 performs alarming process (E-1).

If in STEP 27 a decision is made that lid member 213A is in the open position, final processing unit 632 determines whether lid member 90A is in the open position (STEP 31). If a decision is made that lid member 90A is in the open position, alarm display 641 and alarm display 642 are set ON (STEP 32).

If a decision is made that count T2 is larger than predetermined time T02 (STEP 30), alarming process (E-1) is performed, and if a decision is made that count T2 is equal to or smaller than predetermined time T02, the control returns to STEP 27.

If a decision is made in STEP 31 that lid member 90A is in the closed position, alarm display 641 is set ON and alarm display 642 is set OFF (STEP 33). Then, whether count T2 of timer 280 is larger than predetermined time T02 is determined (STEP 30). If so, final processing unit 632 performs alarming process (E-1). If count T2 is equal to or smaller than predetermined time T02, the control returns to STEP 27.

Herein in FIG. 1 at STEP 2 if unit 633 for determining an initial state determines that lid member 90A is in the closed position, a decision can be made that lid member 213A is alone in the open position.

In that case, connecting refueling connector 191 to refueling unit 213 allows a refueling operation to be performed normally. In contrast, if refueling connector 191 is not inserted within a predetermined period of time, then lid member 213A is left opened, and accordingly, needs to be closed.

Accordingly, a process (A-1) is performed. More specifically, whether lid member 213A and lid member 90A are in their respective open or closed positions and whether connector 190 and refueling connector 191 are connected or not are detected for a predetermined period of time to determine whether lid member 213A is in the open position, lid member 90A in the closed position, and connector 190 and refueling connector 191 disconnected for the predetermined period of time.

Note that unit 610 for determining whether the lids are open/closed sets alarm display 641 ON and sets alarm display 642 OFF (STEP 34-1).

Then, unit 610 for determining whether the lids are open/closed transmits a signal to unit 633 for determining an initial state, and unit 633 for determining an initial state transmits a switching signal P20 to unit 631 for determining whether a state continues for a predetermined period of time.

Figure 22:
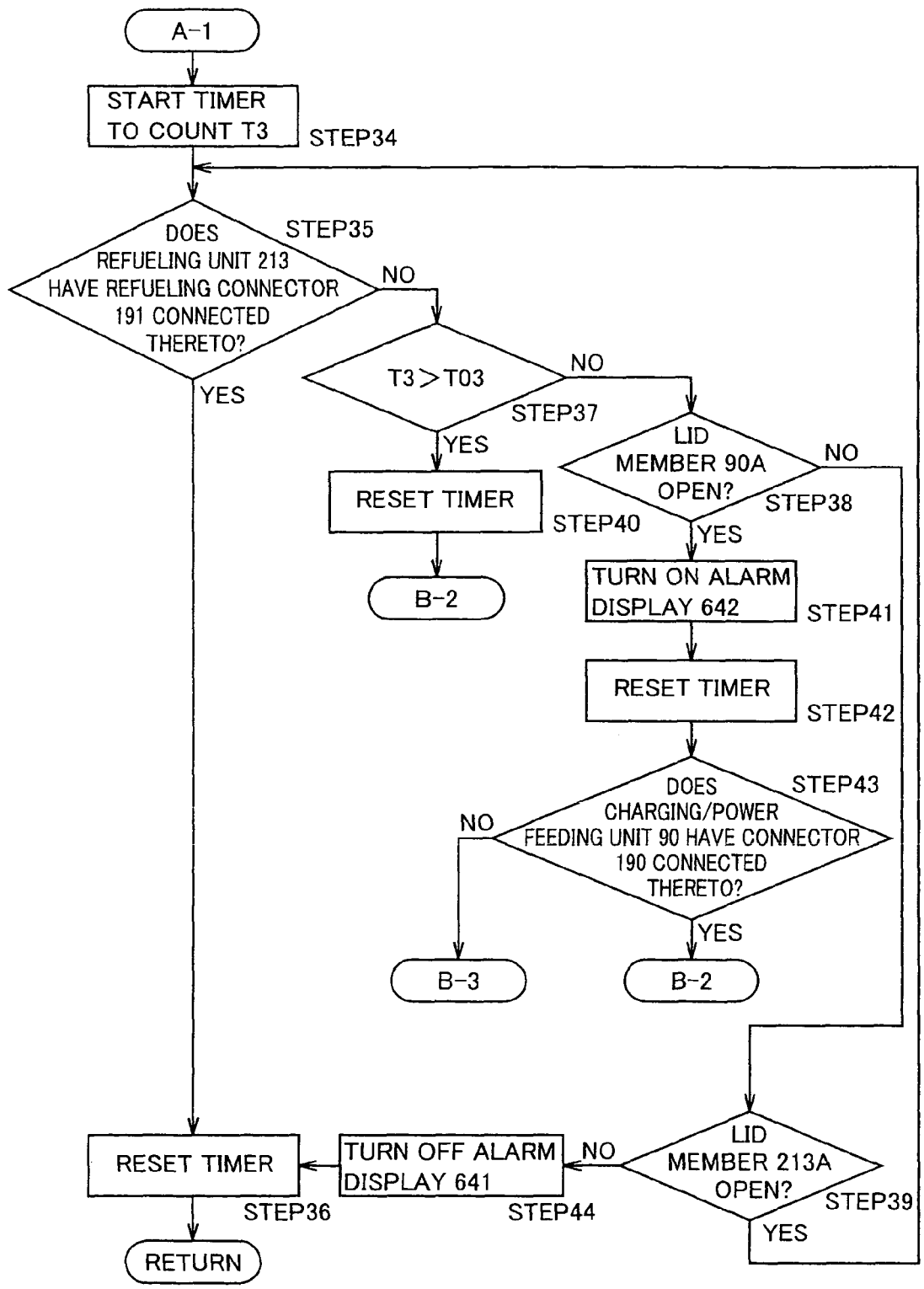
FIG. 22 is a flowchart of a process performed to determine whether a lid member is continuously open, a lid member is continuously closed, and a connector and a fueling connector are continuously disconnected.

FIG. 22 shows a flow indicating a process performed to determine whether lid member 213A is continuously open, lid member 90A is continuously closed, and connector 190 and refueling connector 191 are continuously disconnected. As shown in FIG. 22, initially, unit 631 for determining whether a state continues for a predetermined period of time starts timer 280 to count (STEP 34).

Then, a decision is made on whether refueling unit 213 has refueling connector 191 connected thereto (STEP 35). If so, timer 280 is reset (STEP 36).

Thus when only lid member 213A is in the open position, and refueling unit 213 has refueling connector 191 connected thereto, a decision can be made that a refueling operation is normally performed. Accordingly the control returns to STEP 1.

If in STEP 35 a decision is made that refueling unit 213 does not have refueling connector 191 connected thereto, unit 631 for determining whether a state continues for a predetermined period of time determines whether a count T3 of timer 280 is larger than a predetermined time T03 (STEP 37).

If unit 631 for determining whether a state continues for a predetermined period of time determines that count T3 of timer 280 is equal to or smaller than predetermined time T03, then unit 631 for determining whether a state continues for a predetermined period of time determines whether lid member 90A is in the open position (STEP 38).

If unit 631 for determining whether a state continues for a predetermined period of time determines that lid member 90A is not opened, then the unit determines whether lid member 213A is in the open position (STEP 39). If a decision can be made that lid member 90A is in the closed position, then a decision can be made that lid member 213A is continuously in the open position, lid member 90A is continuously in the closed position, and connector 190 and refueling connector 191 are continuously disconnected.

If unit 631 for determining whether a state continues for a predetermined period of time determines that lid member 213A is in the open position, unit 631 for determining whether a state continues for a predetermined period of time returns to STEP 35.

Then again in STEP 35 a decision is made on whether refueling unit 213 has refueling connector 191 connected thereto, and if not, a decision is made on whether a predetermined time has elapsed (STEP 37).

If unit 631 for determining whether a state continues for a predetermined period of time determines that count T3 is larger than predetermined time T03, it can be seen that lid member 213A is in the open position continuously for a predetermined period of time, lid member 90A is in the closed position continuously for the predetermined period of time, and connector 190 and refueling connector 191 are disconnected continuously for the predetermined period of time.

In that case, a decision can be made that lid member 213A is forgotten to be closed, and accordingly, it is necessary to perform a process to close lid member 213A.

Accordingly, unit 631 for determining whether a state continues for a predetermined period of time resets timer 280 (STEP 40). Then, unit 631 for determining whether a state continues for a predetermined period of time transmits drive information to final processing unit 632. Then, as shown in FIG. 21, a process is performed by final processing unit 632 to close lid member 213A (B-2).

If in STEP 37 a decision is made that count T3 is equal to or smaller than predetermined time T03, a decision is made on whether lid member 90A is in the open position (STEP 38).

If lid member 90A is in the open position, a decision can be made that in process A-1 with lid member 213A open an operator or the like has opened lid member 90A.

In that case, initially, unit 631 for determining whether a state continues for a predetermined period of time sets alarm display 642 ON (STEP 41) and resets timer 280 (STEP 42). A decision is made on whether charging/power feeding unit 90 has connector 190 connected thereto (STEP 43).

If so, lid member 213A needs to be set in the closed position. Accordingly, in that case, final processing unit 632 performs a process (B-2) to set lid member 213A in the closed position, as shown in FIG. 21.

If a decision is made that charging/power feeding unit 90 does not have connector 190 connected thereto, it can be seen that lid member 90A and lid member 213A are both in their respective open positions and neither connector 190 nor refueling connector 191 is connected thereto. In that condition, an operator may perform a charging/power feeding operation and a refueling operation simultaneously. Accordingly, both lid member 90A and lid member 213A need to be set in their respective closed positions. Accordingly, unit 631 for determining whether a state continues for a predetermined period of time transmits drive information P30 to final processing unit 632 to set both lid member 90A and lid member 213A in their respective closed positions, and final processing unit 632 performs a process (B-3) to set both lid member 90A and lid member 213A in their respective closed positions, as shown in FIG. 23.

If in STEP 39 a decision is made that lid member 213A is in the closed position, a decision can be made that lid member 213A and lid member 90A are both set in their respective closed positions and that lid member 213A in the open position has been closed by a driver, an operator or the like.

Accordingly, unit 631 for determining whether a state continues for a predetermined period of time sets alarm display 641 OFF (STEP 44) and resets timer 280 (STEP 36). The control returns to STEP 1 to again determine whether lid member 213A and lid member 90A are in their respective open or closed positions.

If in FIG. 16 at STEP 1 a decision is made that lid member 213A is in the closed position, unit 610 for determining whether the lids are open/closed determines whether lid member 90A is in the open position (STEP 45). If unit 610 for determining whether the lids are open/closed determines that lid member 90A is in the closed position, a decision can be made that only lid member 90A is in the open position.

In that condition it can be inferred that an operator is performing a charging/power feeding operation or to close lid member 90A is forgotten.

Accordingly, unit 610 for determining whether the lids are open/closed sets alarm display 641 OFF and sets alarm display 642 ON (STEP 45-1).

Accordingly, unit 610 for determining whether the lids are open/closed transmits open/close information P10 to unit 633 for determining an initial state, and unit 633 transmits drive information P20 to unit 631 to determine whether lid member 90A is alone in the open position continuously for a predetermined period of time, lid member 213A is in the closed position continuously for the predetermined period of time, and connector 190 is disconnected continuously for the predetermined period of time for determining whether a state continues for the predetermined period of time.

Figure 24:
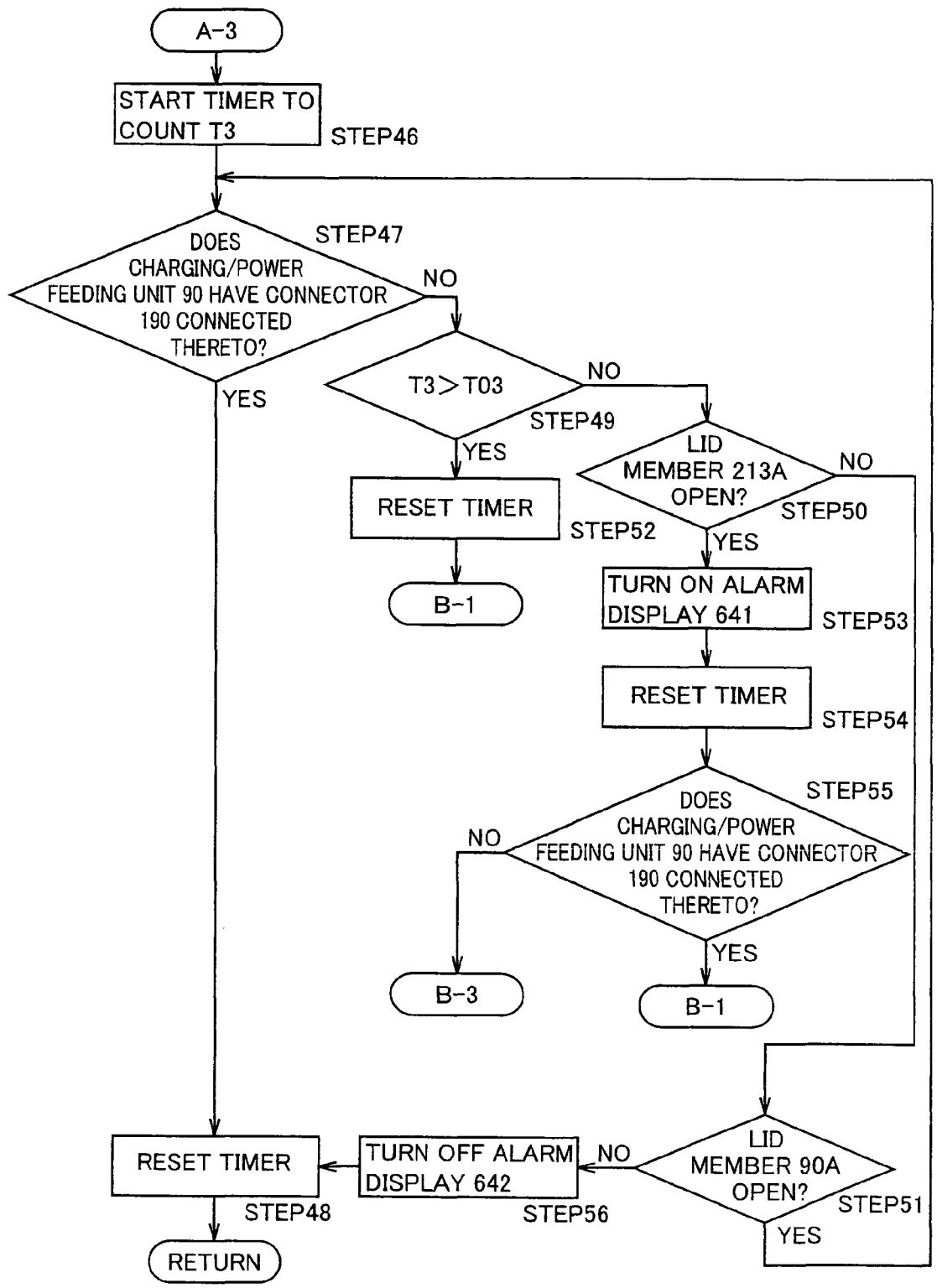
FIG. 24 is a flowchart of a process performed to determine whether one lid member, the other lid member, and a connector are open, closed, and disconnected, respectively, continuously for a predetermined period of time.

FIG. 24 shows a flow indicating a process performed to determine whether lid member 90A, lid member 213A, and connector 190 are open, closed, and disconnected, respectively, continuously for a predetermined period of time.

Unit 631 for determining whether a state continues for a predetermined period of time initially starts timer 280 to count (STEP 46).

Then, a decision is made on whether charging/power feeding unit 90 has connector 190 connected thereto (STEP 47). If so, timer 280 is reset (STEP 48). Thus when lid member 90A is alone in the open position and charging/power feeding unit 90 has connector 190 connected thereto, a decision can be made that a refueling operation is normally performed. Accordingly, the control returns to STEP 1.

If a decision is made in STEP 47 that charging/power feeding unit 90 does not have connector 190 connected thereto, unit 631 for determining whether a state continues for a predetermined period of time determines whether count T3 of timer 280 is larger than predetermined time T03 (STEP 49). If unit 631 for determining whether a state continues for a predetermined period of time determines that count T3 of timer 280 is equal to or smaller than predetermined time T03, unit 631 for determining whether a state continues for a predetermined period of time determines whether lid member 213A is in the open position (STEP 50).

If unit 631 for determining whether a state continues for a predetermined period of time determines that lid member 213A is not opened, then the unit determines whether lid member 90A is in the open position (STEP 51). If a decision can be made that lid member 90A is in the open position, then a decision can be made that lid member 90A is continuously in the open position, lid member 213A is continuously in the closed position, and connector 190 and refueling connector 191 are continuously disconnected.

If unit 631 for determining whether a state continues for a predetermined period of time determines that lid member 90A is in the open position, unit 631 for determining whether a state continues for a predetermined period of time returns to STEP 47. Then again in STEP 47 a decision is made on whether charging/power feeding unit 90 has connector 190 connected thereto, and if not, a decision is made on whether a predetermined time has elapsed (STEP 49).

If unit 631 for determining whether a state continues for a predetermined period of time determines that count T3 is larger than predetermined time T03, it can be seen that lid member 90A is in the open position continuously for a predetermined period of time, lid member 213A is in the closed position continuously for the predetermined period of time, and connector 190 and refueling connector 191 are disconnected continuously for the predetermined period of time.

In that case, a decision can be made that lid member 90A is forgotten to be closed, and accordingly, it is necessary to perform a process to close lid member 90A. Accordingly, unit 631 for determining whether a state continues for a predetermined period of time resets timer 280 (STEP 52). Then, unit 631 for determining whether a state continues for a predetermined period of time transmits drive information to final processing unit 632. Then, as shown in FIG. 18, a process is performed by final processing unit 632 to close lid member 90A (B-1).

If in STEP 49 a decision is made that count T3 is equal to or smaller than predetermined time T03, a decision is made on whether lid member 213A is in the open position. If lid member 213A is in the open position, a decision can be made that in process A-1 with lid member 90A open an operator or the like has opened lid member 213A.

In that case, initially, unit 631 for determining whether a state continues for a predetermined period of time sets alarm display 641 ON (STEP 53) and resets timer 280 (STEP 54). A decision is made on whether refueling unit 213 has refueling connector 191 connected thereto (STEP 55).

If so, lid member 90A needs to be set in the closed position. Accordingly, in that case, final processing unit 632 performs a process (B-1) to set lid member 90A in the closed position, as shown in FIG. 18.

If a decision is made that refueling unit 213 does not have refueling connector 191 connected thereto, it can be seen that lid member 90A and lid member 213A are both in their respective open positions and neither connector 190 nor refueling connector 191 is connected thereto. In that condition, an operator may perform a charging/power feeding operation and a refueling operation simultaneously. Accordingly, both lid member 90A and lid member 213A need to be set in their respective closed positions. Accordingly, unit 631 for determining whether a state continues for a predetermined period of time transmits drive information P30 to final processing unit 632 to set both lid member 90A and lid member 213A in their respective closed positions, and final processing unit 632 performs a process (B-3) to set both lid member 90A and lid member 213A in their respective closed positions, as shown in FIG. 23.

If in STEP 51 a decision is made that lid member 90A is in the closed position, a decision can be made that lid member 213A and lid member 90A are both set in their respective closed positions and that lid member 213A in the open position has been closed by a driver, an operator or the like.

Accordingly, unit 631 for determining whether a state continues for a predetermined period of time sets alarm display 642 OFF (STEP 56) and resets timer 280 (STEP 48). Then, the process returns to STEP 1.

In FIG. 16 if at STEP 45 unit 610 for determining whether the lids are open/closed determines that lid member 90A is in the closed position, lid member 90A and lid member 213A are both in their respective closed positions and the control again returns to STEP 1.

Thus a vehicle including open/close control mechanism 500 can prevent performing a refueling operation and a charging/power feeding operation simultaneously.

It should be understood that the embodiments disclosed herein are illustrative and non-restrictive in any respect. The scope of the present invention is defined by the terms of the claims, rather than the embodiments described above, and is intended to include any modifications within the scope and meaning equivalent to the terms of the claims. Furthermore, the numerical values indicated above are merely illustrative, and the present invention is not limited the numerical values and scope indicated above.

INDUSTRIAL APPLICABILITY

The present invention provides a vehicle suitable for a vehicle supplied with a plurality of types of energy sources.

The invention claimed is:

1. A vehicle comprising:
a first drive unit driven by a first energy source;
a first storage unit capable of storing said first energy source;
a first energy receiving unit having a first energy supply unit attachably and detachably connected thereto, and receiving said first energy source;
a first lid member capable of opening and closing an opening of a first compartment accommodating said first energy receiving unit;
a first connection unit connected to said first energy receiving unit and guiding to said first storage unit said first energy source received by said first energy receiving unit;
a second drive unit driven by a second energy source different from said first energy source;
a second storage unit storing said second energy source therein;
a second energy receiving unit having a second energy supply unit attachably and detachably connected thereto, and receiving said second energy source;
a second lid member capable of opening and closing an opening of a second compartment accommodating said second energy receiving unit;
a second connection unit connected to said second energy receiving unit and guiding to said second storage unit said second energy source received by said second energy receiving unit; and
an open/close control mechanism holding the other of said first lid member and said second lid member in a closed position when one of said first lid member and said second lid member is set in an open position, said open/close control mechanism including a coupling member coupling said first lid member and said second lid member so that when one of said first lid member and said second lid member is set in said open position, a tension is caused in said coupling member to close the other lid member.

2. The vehicle according to claim 1, wherein:
said first energy source is fuel;
said first storage unit is a fuel tank storing said fuel therein in a form of liquid;
said first connection unit is a piping guiding said fuel in said form of liquid from said first energy receiving unit to said fuel tank;
said second energy source is electric power;
said second storage unit is a power storage device storing direct current electric power as said second energy source; and
said second connection unit is a line passing electric power.

3. The vehicle according to claim 2, said second drive unit being a rotating electric machine driven by said second energy source of alternate current electric power, said rotating electric machine including a first rotating electric machine having a first multiphase winding and a first neutral point of said first multiphase winding, and a second rotating electric machine having a second multiphase winding and a second neutral point of said second multiphase winding, said second connection unit including a first line connected to said first neutral point and a second line connected to said second neutral point, the vehicle further comprising:

a first inverter receiving said second energy source of direct current electric power from said power storage device, converting said second energy source of direct current electric power to said second energy source of alternate current electric power, and supplying said second energy source of alternate current electric power to said first rotating electric machine;

a second inverter receiving said second energy source of direct current electric power from said power storage device, converting said second energy source of direct current electric power to said second energy source of alternate current electric power, and supplying said second energy source of alternate current electric power to said second rotating electric machine; and an inverter control unit controlling said first and second inverters to convert alternate current electric power provided from said second connection unit to said first and second neutral points to direct current electric power and supply said direct current electric power to said power storage device.

4. The vehicle according to claim 2, said second drive unit being a rotating electric machine driven by said second energy source of alternate current electric power, said rotating electric machine including a first rotating electric machine having a first multiphase winding and a first neutral point of said first multiphase winding, and a second rotating electric machine having a second multiphase winding and a second neutral point of said second multiphase winding, said second connection unit including a first line connected to said first neutral point and a second line connected to said second neutral point, the vehicle further comprising:

a first inverter receiving said second energy source of direct current electric power from said power storage device, converting said second energy source of direct current electric power to said second energy source of alternate current electric power, and supplying said second energy source of alternate current electric power to said first rotating electric machine;

a second inverter receiving said second energy source of direct current electric power from said power storage device, converting said second energy source of direct current electric power to said second energy source of alternate current electric power, and supplying said second energy source of alternate current electric power to said second rotating electric machine; and an inverter control unit controlling said first and second inverters to convert direct current electric power supplied from said power storage device to said first and second inverters to alternate current electric power and supply said alternate current electric power through said second connection unit to an external load.

5. The vehicle according to claim 1, wherein said coupling member includes a wire coupling said first lid member and said second lid member.

6. A vehicle comprising:
a first drive unit driven by a first energy source;
a first storage unit capable of storing said first energy source;

a first energy receiving unit having a first energy supply unit attachably and detachably connected thereto, and receiving said first energy source;

a first lid member capable of opening and closing an opening of a first compartment accommodating said first energy receiving unit;

a first connection unit connected to said first energy receiving unit and guiding to said first storage unit said first energy source received by said first energy receiving unit;

a second drive unit driven by a second energy source different from said first energy source;

a second storage unit storing said second energy source therein;

a second energy receiving unit having a second energy supply unit attachably and detachably connected thereto, and receiving said second energy source;

a second lid member capable of opening and closing an opening of a second compartment accommodating said second energy receiving unit;

a second connection unit connected to said second energy receiving unit and guiding to said second storage unit said second energy source received by said second energy receiving unit; and an open/close control mechanism holding the other of said first lid member and said second lid member in a closed position when one of said first lid member and said second lid member is set in an open position, wherein said open/close control mechanism includes an operation mechanism switchable between a first position that allows said first lid member to be operable to be opened/closed and sets said second lid member in said closed position, and a second position that allows said second lid member to be operable to be opened/closed and sets said first lid member in said closed position;

said operation mechanism includes an operation portion switchable by a user, a coupling member for a first operation coupling said operation portion and said first lid member, and a coupling member for a second operation coupling said operation portion and said second lid member;

said operation mechanism is set in said first position to: provide said coupling member for said first operation with a slack to allow said first lid member to be operable to be opened/closed; and also reduce a slack of said coupling member for said second operation to set said second lid member in said closed position; and said operation mechanism is set in said second position to: reduce said slack of said coupling member for said first operation to set said first lid member in said closed position; and also provide said coupling member for said second operation with said slack to allow said second lid member to be operable to be opened/closed.

7. The vehicle according to claim 6, wherein:
said operation portion includes a rotatably provided rotation member, and an axial portion rotatably supporting said rotation member; and said coupling member for said first operation is connected to said rotation member at a portion remote from said axial portion, and said coupling member for said second operation is connected to said rotation member at a portion located opposite to said portion having said coupling member for said first operation connected thereto with said axial portion posed therebetween.

* * * * *